United States Patent
Fujinami et al.

(10) Patent No.: US 12,218,538 B2
(45) Date of Patent: Feb. 4, 2025

(54) TECHNIQUE FOR CONTROLLING VOLTAGE TO BE SUPPLIED TO ELECTRIC APPLIANCE

(71) Applicant: MAKITA CORPORATION, Anjo (JP)

(72) Inventors: Katsuhito Fujinami, Anjo (JP); Ken Yamauchi, Anjo (JP); Yasuyuki Fujimoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 522 days.

(21) Appl. No.: 17/680,459

(22) Filed: Feb. 25, 2022

(65) Prior Publication Data
US 2022/0278539 A1 Sep. 1, 2022

(51) Int. Cl.
*H02J 7/00* (2006.01)
*A41D 1/00* (2018.01)
*H01M 50/204* (2021.01)
*H01M 50/247* (2021.01)

(52) U.S. Cl.
CPC ............ *H02J 7/0045* (2013.01); *A41D 1/002* (2013.01); *H01M 50/204* (2021.01); *H01M 50/247* (2021.01); *H02J 7/007182* (2020.01); *A41D 2400/12* (2013.01); *H01M 2220/30* (2013.01)

(58) Field of Classification Search
CPC .............. H02J 7/0045; H02J 7/007182; H02J 7/00304; H02J 7/00306; H02J 7/0031; H02J 7/0063; H02J 7/0047; H02J 7/0029; H02J 7/00309; H02J 7/007; H02J 7/12; A41D 1/002; A41D 2400/12; A41D 13/0025; A41D 13/0051; H01M 50/204; H01M 50/247; H01M 2220/30; H01M 10/425; H01M 10/48; H05K 7/20909
USPC ........................................................ 320/112
See application file for complete search history.

(56) References Cited

U.S. PATENT DOCUMENTS

| 5,672,288 A * | 9/1997 | Tran ..................... A47J 37/0842 219/505 |
| 7,618,340 B2 * | 11/2009 | Yang ..................... B60W 10/08 477/3 |
| 8,154,249 B2 * | 4/2012 | Johnson .............. H01M 10/441 173/214 |
| 11,289,930 B2 * | 3/2022 | Reed ...................... A47L 9/2842 |

(Continued)

FOREIGN PATENT DOCUMENTS

| JP | 3118697 U | 2/2006 |
| JP | 2007-174720 A | 7/2007 |

(Continued)

*Primary Examiner* — M Baye Diao
(74) *Attorney, Agent, or Firm* — Oliff PLC

(57) ABSTRACT

A voltage control device in one aspect of the present disclosure includes an appliance connector, a voltage output circuit, a manual switch, and a controller. The voltage output circuit outputs an operating voltage based on a direct voltage received from a direct-current power source. In response to a first electric appliance being connected to the appliance connector, the controller controls the voltage output circuit so as to fix the operating voltage. In response to a second electric appliance being connected to the appliance connector, the controller controls the voltage output circuit so as to vary the operating voltage in accordance with a manual operation applied to the manual switch.

16 Claims, 20 Drawing Sheets

(56) References Cited

U.S. PATENT DOCUMENTS

| | | | |
|---|---|---|---|
| 2002/0149345 A1* | 10/2002 | Takano | H02J 7/0068 |
| | | | 320/137 |
| 2003/0178977 A1* | 9/2003 | Wu | G05F 1/56 |
| | | | 323/282 |
| 2013/0025893 A1 | 1/2013 | Ota et al. | |
| 2016/0359345 A1* | 12/2016 | Uesugi | H02J 7/00047 |
| 2020/0119409 A1 | 4/2020 | Umemura et al. | |

FOREIGN PATENT DOCUMENTS

| | | |
|---|---|---|
| JP | 2011-218510 A | 11/2011 |
| JP | 6661715 B2 | 3/2020 |
| JP | 2020-061910 A | 4/2020 |

* cited by examiner

TECHNIQUE FOR CONTROLLING VOLTAGE TO BE SUPPLIED TO ELECTRIC APPLIANCE

CROSS-REFERENCE TO RELATED APPLICATIONS

The present application claims the benefit of Japanese Patent Application No. 2021-030415 filed on Feb. 26, 2021 with the Japan Patent Office, the entire disclosure of which is incorporated herein by reference.

BACKGROUND

The present disclosure relates to controlling a voltage to be supplied to an electric appliance.

Japanese Patent No. 6661715 discloses a heat insulated jacket having a heat generator incorporated therein. An operating voltage to be supplied to the heat insulated jacket is controlled by a controller of a jacket electric circuit.

SUMMARY

In general, the heat generator of the heat insulated jacket operates with a voltage distinct from a voltage required for driving a fan of a fan jacket. For this reason, the above described controller of the jacket electric circuit is not applicable to the fan jacket and therefore, the fan jacket requires its dedicated controller for controlling the operating voltage. Consequently, this may degrade convenience of the heat insulated jacket and the fan jacket.

In one aspect of the present disclosure, it is desirable to provide a single voltage control device that can be used in multiple types of electric appliance.

One aspect of the present disclosure provides a voltage control device (or a power source control device). The voltage control device includes an appliance connector, a voltage output circuit, a manual switch, and/or a controller. The appliance connector is selectively connected to a first electric appliance (or a first electric equipment) or a second electric appliance (or a second electric equipment). The voltage output circuit receives a direct voltage from a direct-current power source. The voltage output circuit outputs an operating voltage based on the direct voltage. The operating voltage is variable (or adjustable). The manual switch is manually operated by a user of the voltage control device. In response to the first electric appliance being connected to the appliance connector, the controller controls the voltage output circuit so as to fix the operating voltage. In response to the second electric appliance being connected to the appliance connector, the controller controls the voltage output circuit so as to vary (or change or adjust) the operating voltage in accordance with a manual operation applied to the manual switch.

With the above voltage control device, the first electric appliance can be supplied with corresponding operating voltage. Furthermore, the second electric appliance can be supplied with its corresponding operating voltage. The voltage control device is usable for both the first electric appliance and the second electric appliance, thereby improving convenience of the first electric appliance and the second electric appliance.

The manual switch may be any switch configured to be manually operated by the user. Examples of the manual switch may include a tactile switch, a membrane switch, a slide switch, a toggle switch, a Dual In-line Package (DIP) switch, a rotary switch, a keypad, a touch switch, and a touch panel.

The first electric appliance may correspond to a first model of the first electric appliance or a second model of the first electric appliance.

In response to the first model of the first electric appliance being connected to the appliance connector, the controller may control the voltage output circuit so as to fix the operating voltage to a first voltage. In response to the second model of the first electric appliance being connected to the appliance connector, the controller may control the voltage output circuit so as to fix the operating voltage to a second voltage. The second voltage may be distinct from the first voltage.

The second electric appliance may correspond to a first model of the second electric appliance or a second model of the second electric appliance.

In response to the first model of the second electric appliance being connected to the appliance connector, the controller may control the voltage output circuit so as to vary the operating voltage between voltage values included in a first set of voltage values in accordance with the manual operation. In response to the second model of the second electric appliance being connected to the appliance connector, the controller may control the voltage output circuit so as to vary the operating voltage between voltage values included in a second set of voltage values in accordance with the manual operation. The second set of voltage values may include more voltage values than the first set of voltage values. Alternatively, the second set of voltage values may include less voltage values than the first set of voltage values.

The first electric appliance may include a first connection plug including a first resistor. The first resistor may have a first resistance value. The first connection plug may be configured to be connected to the appliance connector.

The controller may detect that the first electric appliance is connected to the appliance connector based on a voltage across the first resistor. The controller as above can easily detect that the first electric appliance is connected to the appliance connector based on the voltage across the first resistor.

The first resistor in the first model of the first electric appliance may have a resistance value distinct from a resistance value of the first resistor in the second model of the first electric appliance. In this case, the controller can easily identify, based on the voltage across the first resistor, whether the first electric appliance connected to the appliance connector is of the first model or the second model.

The second electric appliance may include a second connection plug including a second resistor. The second resistor may have a second resistance value. The second resistance value may be distinct from the first resistance value. The second connection plug may be configured to be connected to the appliance connector.

The controller may detect that the second electric appliance is connected to the appliance connector based on a voltage across the second resistor. The controller as above can easily detect that the second electric appliance is connected to the appliance connector based on the voltage across the second resistor.

The second resistor in the first model of the second electric appliance may have a resistance value distinct from a resistance value of the second resistor in the second model of the second electric appliance. In this case, the controller can easily identify, based on the voltage across the second resistor, whether the second electric appliance connected to the appliance connector is of the first model or the second model.

The first electric appliance may include a heat generator. The first electric appliance may be configured in the form of a garment including the heat generator or a lap blanket including the heat generator.

The second electric appliance may include a fan. The fan may be configured to be attached to a helmet. The second electric appliance may be configured in the form of a garment including the fan or a helmet including the fan.

The first electric appliance and/or the second electric appliance may be configured in the form of a lighting appliance. Examples of the lighting appliance may include a flash light, a head mount light, and a lantern.

Additionally, examples of the first electric appliance and/or the second electric appliance may include various electric appliance to be used at job-sites, such as a do-it-yourself carpentry site, a building site, a manufacturing site, a gardening site, and a construction site. Specifically, examples of the first electric appliance and/or the second electric appliance may include a laser distance measure (or a laser distance meter), a laser marker (or laser level), a light receiver of a laser marker, a wall scanner, a radio, a television, a speaker, an electric heat insulated cooler/warmer, an electric kettle, a coffee machine (or a coffee maker or a coffee distiller), a communicator, and a portable terminal. Examines of the portable terminal may include a mobile phone, a smartphone, a tablet computer, and a laptop computer.

Another aspect of the present disclosure provides a system (or power source control system or voltage control system) including the first electric appliance, the second electric appliance, and/or the voltage control device described above.

The system as above can exhibit the same effect as that of the voltage control device described above.

Still another aspect of the present disclosure provides a method including:

connecting a first electric appliance or a second electric appliance to a voltage control device;

in response to the first electric appliance being connected to the voltage control device, fixing an operating voltage to be output from the voltage control device to the first electric appliance; and/or in response to the second electric appliance being connected to the voltage control device, varying the operating voltage to be output to the second electric appliance in accordance with a manual operation applied to a manual switch of the voltage control device.

The method as above can exhibit the same effect as that of the voltage control device described above.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

First Embodiment

Figure 1:
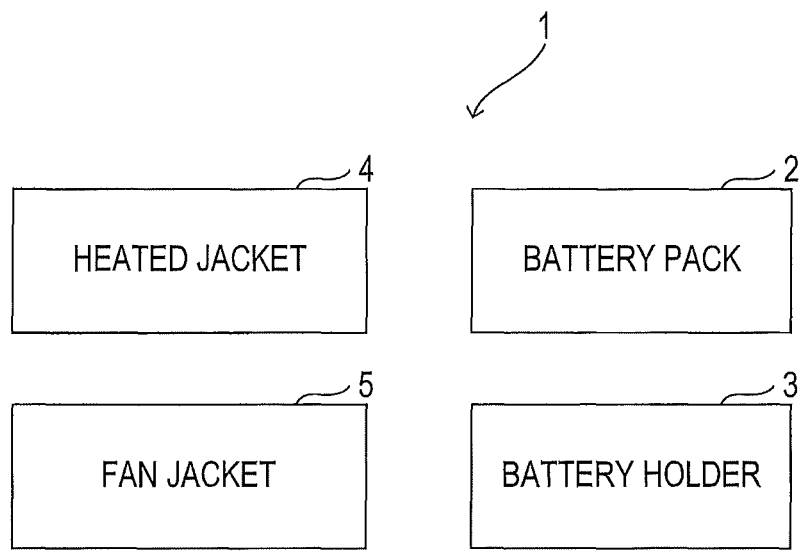
FIG. 1 is a block diagram showing a configuration of a system according to a first embodiment.

As shown in FIG. 1, there is provided a system 1 in the first embodiment. The system 1 includes a battery pack 2, a battery holder 3, a heated jacket (or heat insulated jacket) 4, and a fan jacket 5.

The battery pack 2 is detachably attached to various battery-operated electric work machines. The battery pack 2 supplies a power-supply voltage to a driving source (for example, a motor) of a battery-operated electric work machine attached to the battery pack 2.

The battery holder 3 is detachably attached to the battery pack 2. The battery holder 3 is selectively connected to the heated jacket 4 or the fan jacket 5. The battery holder 3 (i) receives a battery voltage VB from the battery pack 2 and (ii) outputs operating voltages required for the heated jacket 4 and the fan jacket 5.

Figure 2:
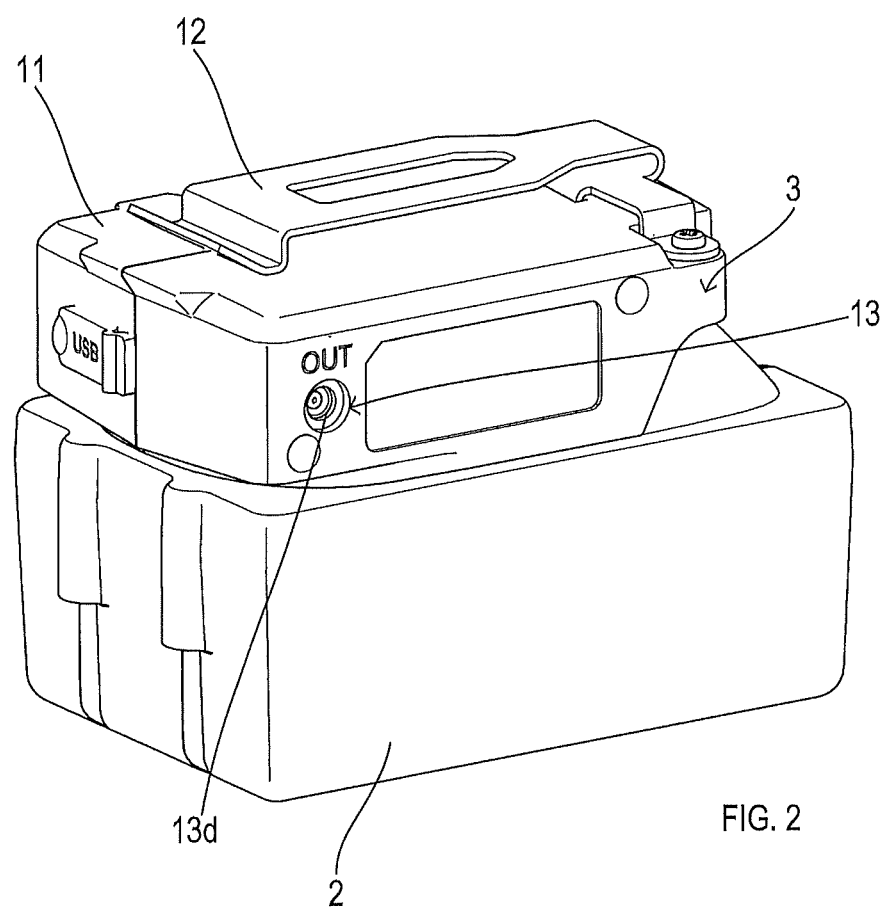
FIG. 2 is a perspective view of a battery pack and a battery holder.

As illustrated in FIG. 2, the battery holder 3 includes a holder main body 11. The holder main body 11 has a component(s) of the battery holder 3 accommodated therein. The holder main body 11 includes a not-shown surface provided with a not-shown pair of grooves thereto. The battery pack 2 is attached to the battery holder 3 upon (i) the pair of grooves being engaged with a not-shown pair of guiding rails provided to the battery pack 2 and (ii) the battery pack 2 being moved along an extending direction of the pair of guiding rails.

The battery holder 3 includes a belt clip 12. In general, a wearer wears a belt on the waist. The battery holder 3 is attached to this belt with the belt threaded through a space between the belt clip 12 and the holder main body 11.

The battery holder 3 includes a direct-current (DC) connector 13. The DC connector 13 is connected to the heated jacket 4 or the fan jacket 5, The DC connector 13 of the first embodiment is in the form of a receptacle (or female connector) including a recess 13d. In another embodiment, the DC connector 13 may be of various forms different from that of the receptacle. In still another embodiment, the DC connector 13 may be of the form conforming to the Universal Serial Bus standards.

Figure 3:
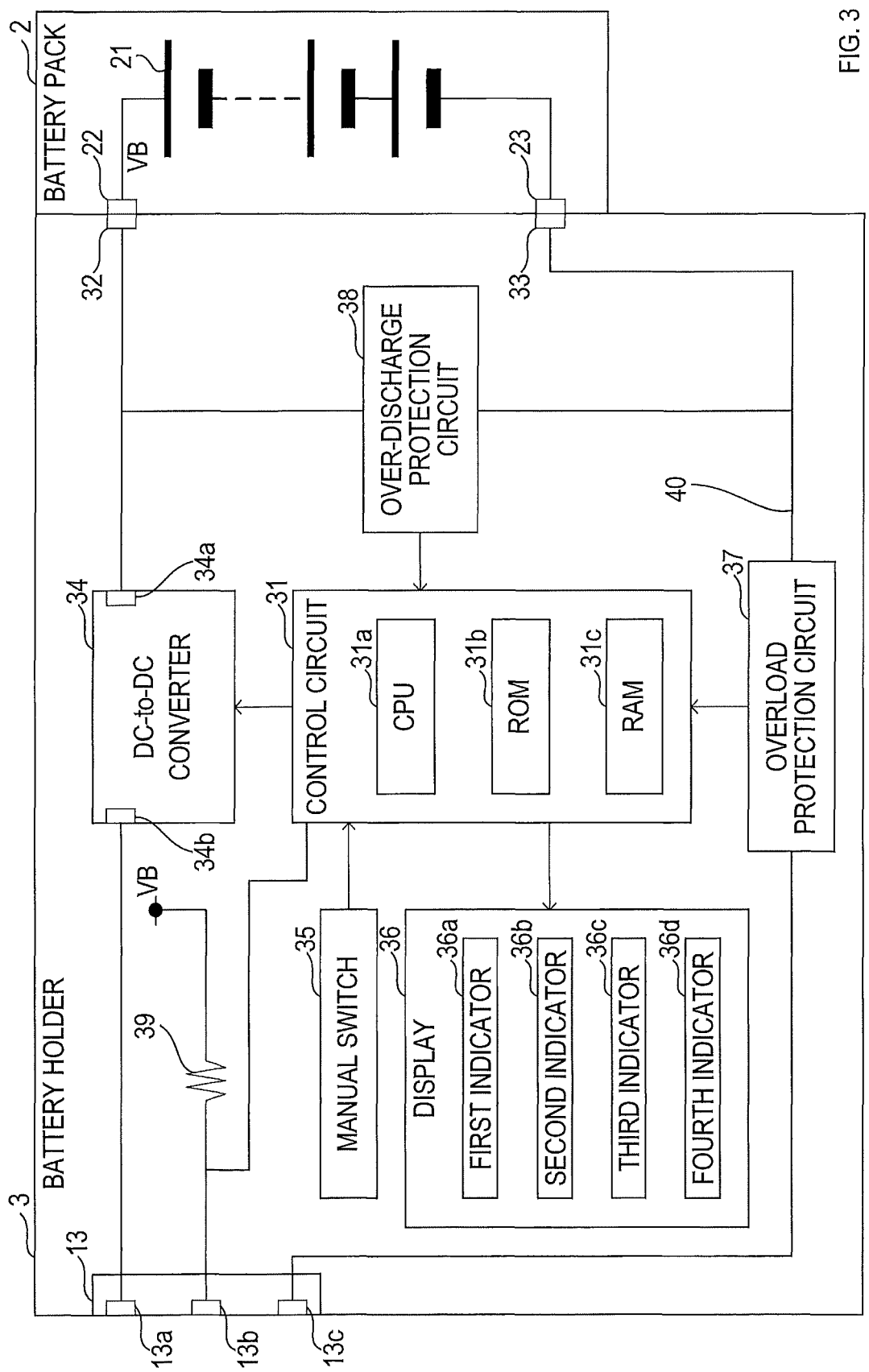
FIG. 3 is a block diagram showing an electrical configuration of the battery pack and the battery holder.

As shown in FIG. 3, the battery pack 2 includes a battery 21. The battery 21 outputs the battery voltage VB. The battery 21 of the first embodiment includes two or more rechargeable batteries connected in series. In another embodiment, the battery 21 may include a single rechargeable battery. Alternatively, in still another embodiment, the battery 21 may include one or more non-rechargeable batteries in place of or in addition to one or more rechargeable batteries. The battery pack 2 includes a positive terminal 22 connected to a positive electrode of the battery 21. The battery pack 2 includes a negative terminal 23 connected to a negative electrode of the battery 21.

The DC connector 13 provided to the battery holder 3 includes a first connection terminal 13a, a second connection terminal 13b, and a third connection terminal 13c.

The battery holder 3 includes a control circuit 31. The control circuit 31 of the first embodiment is in the form of a microcomputer including a CPU 31a, a ROM 31b, and a RAM 31c. Various functions of the control circuit 31 are performed when the CPU 31a executes a program stored in a non-transitory tangible storage medium. In the first embodiment, the ROM 31b corresponds to the non-transitory tangible storage medium storing the program. By the CPU 31a executing this program, a method(s) corresponding to the program is/are carried out. Some of or the entirety of the various functions performed by the CPU 31a may be achieved by hardware (or a hard-wired circuit(s)). In another embodiment, the control circuit 31 may be in the form of a logic circuit including two or more electronic components. In this case, the control circuit 31 may include an Application Specific Integrated Circuit (ASIC) and/or an Application Specific Standard Product (ASSP). Alternatively, the control circuit 31 may include a programmable logic device that can configure any logic circuit(s). Examples of such a programmable logic device include a field programmable gate array (FPGA). The battery holder 3 may include two or more microcomputers in place of or in addition to the control circuit 31.

The battery holder 3 includes a positive terminal 32 configured to be connected to the positive terminal 22 of the battery pack 2. The battery holder 3 includes a negative terminal 33 configured to be connected to the negative terminal 23 of the battery pack 2.

The battery holder 3 includes a Direct-Current to Direct-Current (DC-to-DC) converter 34. The DC-to-DC converter 34 includes a voltage input terminal 34a connected to the positive terminal 32. The voltage input terminal 34a receives the battery voltage VB from the battery pack 2. In accordance with a command from the control circuit 31, the DC-to-DC converter 34 steps down the battery voltage VB and generates the above-described operating voltages. The DC-to-DC converter 34 includes a voltage output terminal 34b connected to the first connection terminal 13a of the DC connector 13. The DC-to-DC converter 34 outputs the operating voltages from the voltage output terminal 34b.

The battery holder 3 includes a manual switch 35. The manual switch 35 of the first embodiment is in the form of a tactile switch that turns ON only while the manual switch 35 is pressed. In another embodiment, the manual switch 35 may be of various forms different from the tactile switch. The manual switch 35 of the first embodiment is manually operated in first and second methods. The first method is a long press. The long press is a manual operation to press and hold the manual switch 35 for a given length of time (for example, two seconds) or longer. The second method is a short press. The short press is a manual operation to press and hold the manual switch 35 for a length of time shorter than the given length of time.

The battery holder 3 includes a display 36. The display 36 includes first through fourth indicators 36a through 36d. The first through fourth indicators 36a through 36d of the first embodiment are configured to selectively light up in red or green. Each of the first through fourth indicators 36a through 36d of the first embodiment includes a red light emitting diode (LED) and a green LED. In another embodiment, each of the first through fourth indicators 36a through 36d may include a light source different from the LED. Furthermore, each of the first through fourth indicators 36a through 36d may be configured to selectively light up in colors different from red and green.

The battery holder 3 includes an overload protection circuit 37. The overload protection circuit 37 is provided on a ground line 40 between the third connection terminal 13c of the DC connector 13 and the negative terminal 33. The overload protection circuit 37 forcibly stops discharge of the battery 21 when a value of a current discharged from the battery 21 exceeds a preset overload threshold.

The battery holder 3 includes an over-discharge protection circuit 38. The over-discharge protection circuit 38 is connected to the voltage input terminal 34a of the DC-to-DC converter 34 and to the ground line 40 so as to be connected in parallel with the battery 21. The over-discharge protection circuit 38 forcibly stops discharge of the battery 21 when a value of the battery voltage VB is less than a preset over-discharge threshold.

The battery holder 3 includes a resistor 39. The resistor 39 includes a first end to apply the battery voltage VB. The resistor 39 includes a second end connected to the second connection terminal 13b of the DC connector 13 and to the control circuit 31.

Figure 4:
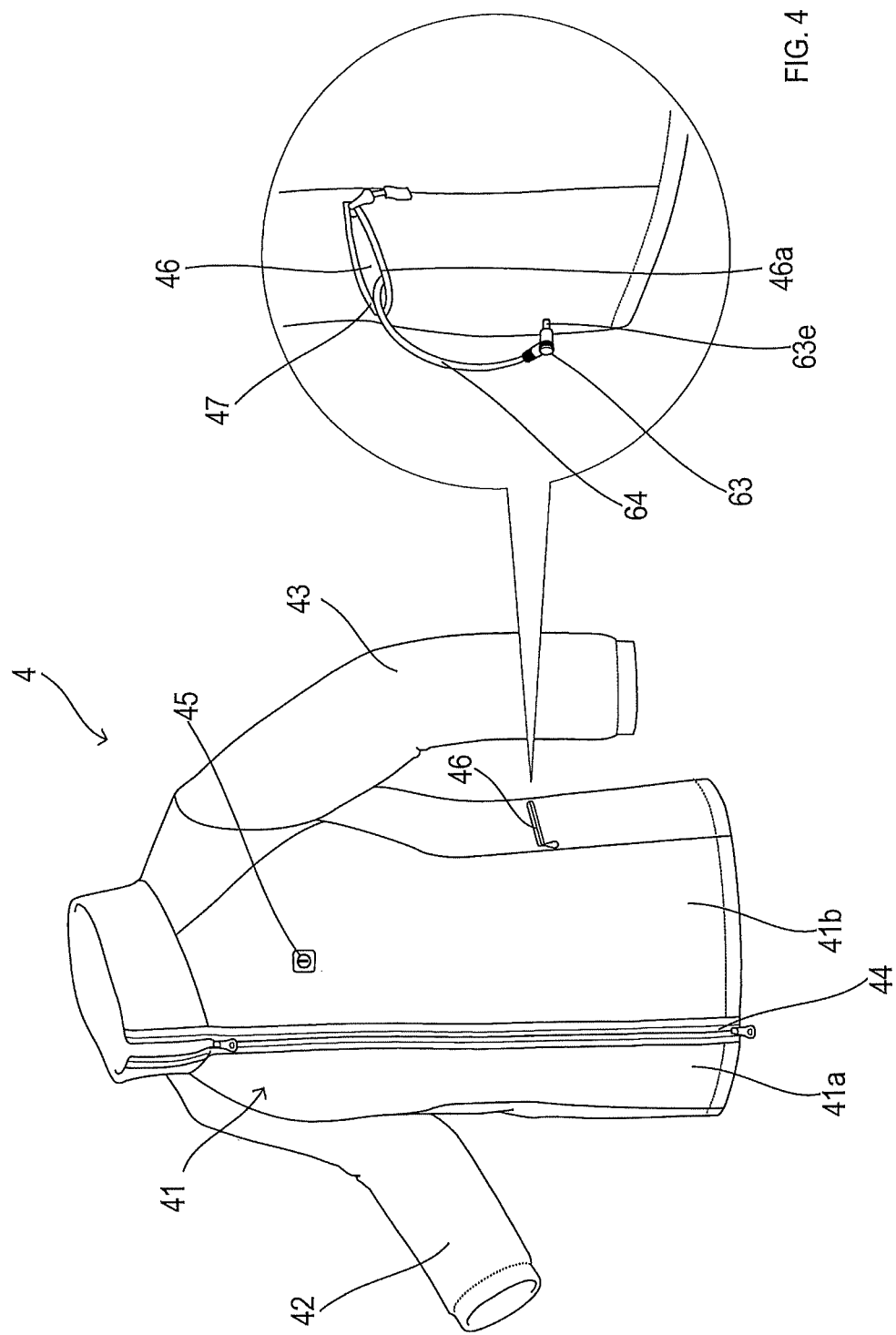
FIG. 4 is a perspective view of a heated jacket.

As illustrated in FIG. 4, the heated jacket 4 of the first embodiment is in the form of an upper garment to cover a body (or an upper body) and arms of the wearer. The heated jacket 4 includes a body part 41 to cover the body of the wearer. The body part 41 includes a right-front body part 41a to cover a right side of the front of the body of the wearer. The body part 41 includes a left-front body part 41b to cover a left side of the front of the body of the wearer. The body part 41 includes a fastener 44 configured to removably couple the left-front body part 41b to the right-front body part 41a. The fastener 44 of the first embodiment is in the form of a slide fastener. In another embodiment, the fastener 44 may be of various forms different from the slide fastener. The heated jacket 4 includes a right sleeve 42 to cover the right arm of the wearer. The heated jacket 4 includes a left sleeve 43 to cover the left arm of the wearer.

The heated jacket 4 includes a manual switch 45. The manual switch 45 is attached to an upper part of the left-front body part 41b. The manual switch 45 of the first embodiment is in the form of a tactile switch that turns ON only while the manual switch 45 is pressed. In another embodiment, the manual switch 45 may be of various forms different from the tactile switch. The manual switch 45 of the first embodiment is manually operated in the above described first and second methods.

The body part 41 includes a battery pocket 46 to accommodate the battery pack 2 and the battery holder 3 therein. The battery pocket 46 includes an opening 46a that is opened or closed with a fastener 47. The fastener 47 of the first embodiment is in the form of a slide fastener. In another embodiment, the fastener 47 may be of various forms different from the slide fastener.

Figure 5:
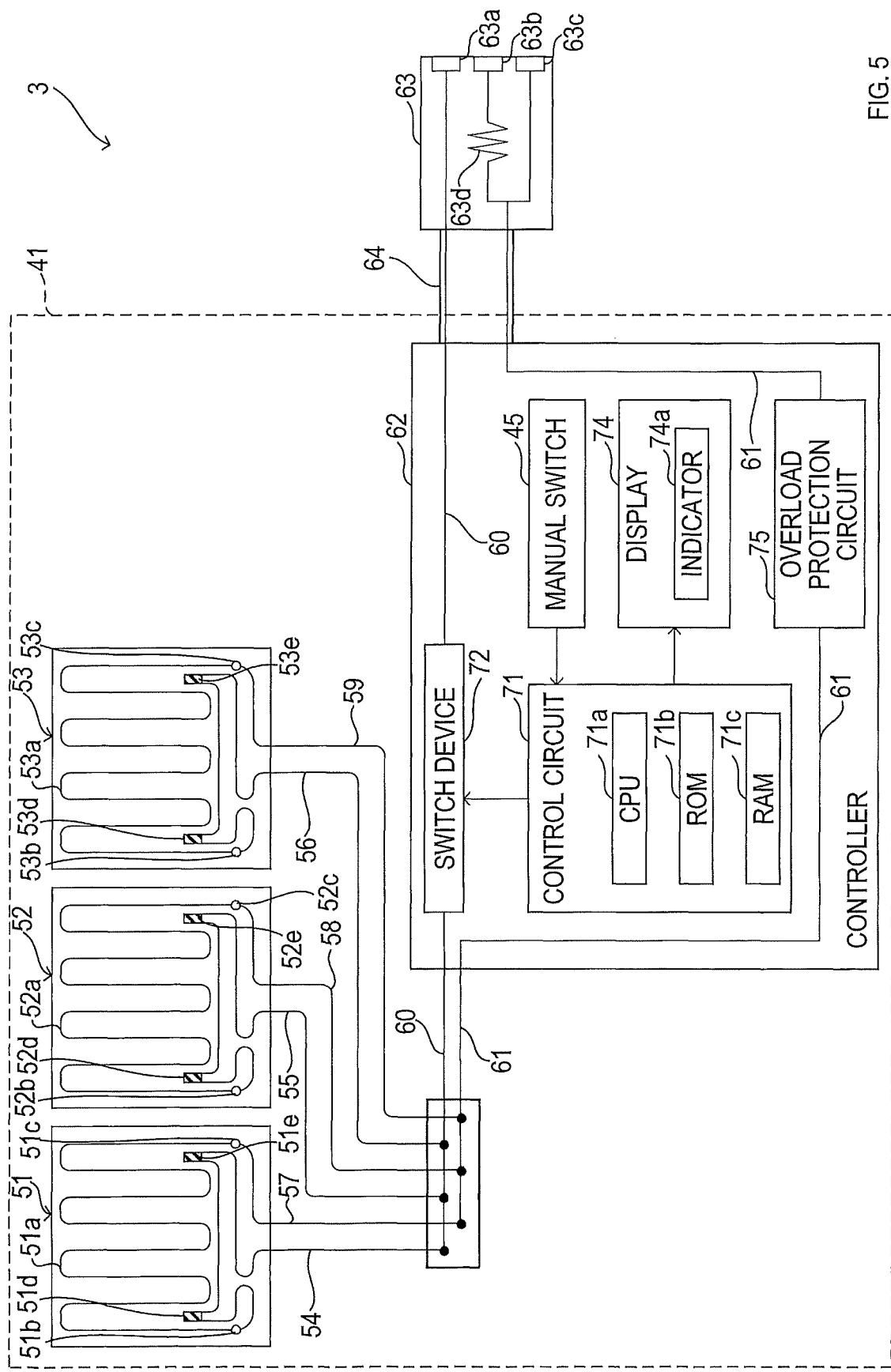
FIG. 5 is a block diagram showing an electrical configuration of the heated jacket.

As shown in FIG. 5, the body part 41 includes first through third heat generators 51 through 53, first through third positive side electric wires 54 through 56, first through third negative side electric wires 57 through 59, a power-supply line 60, and a ground line 61.

In the first embodiment, the first heat generator 51 is provided between an outer fabric and a lining fabric of the right-front body part 41*a*. In another embodiment, the first heat generator 51 may be provided to a position different from the position between the outer fabric and the lining fabric of the right-front body part 41*a*. The first heat generator 51 includes a heat generating part 51*a*, a positive side connection point 51*b*, a negative side connection point 51*c*, a positive side thermostat 51*d*, and a negative side thermostat 51*e*.

The heat generating part 51*a* includes a linear carbon fiber. The carbon fiber is curved in a sinuous form at multiple locations. The heat generating part 51*a* includes a first end attached to the positive side connection point 51*b*. The heat generating part 51*a* includes a second end attached to the negative side connection point 51*c*.

The first positive side electric wire 54 includes a first end connected to the positive side connection point 51*b*. The first positive side electric wire 54 includes a second end connected to the power-supply line 60. The first positive side electric wire 54 is bent so as to pass through an area near the positive side connection point Sib and an area near the negative side connection point 51*c*.

The positive side thermostat 51*d* is provided to the first positive side electric wire 54 near the positive side connection point 51*b*. The negative side thermostat 51*e* is provided to the first positive side electric wire 54 near the negative side connection point 51*c*. Each of the positive side thermostat 51*d* and the negative side thermostat 51*e* is a switch to interrupt electrical conduction to the heat generating part 51*a* upon a temperature of each thermostat exceeding a specified upper limit temperature. The positive side thermostat 51*d* and the negative side thermostat 51*e* are electrically connected in series to the heat generating part 51*a*.

The first negative side electric wire 57 includes a first end connected to the negative side connection point 51*c*. The first negative side electric wire 57 includes a second end connected to the ground line 61.

In the first embodiment, the second heat generator 52 is provided between an outer fabric and a lining fabric of the left-front body part 41*b*. In another embodiment, the second heat generator 52 may be provided to a position different from the position between the outer fabric and the lining fabric of the left-front body part 41*a*. The second heat generator 52 includes a heat generating part 52*a*, a positive side connection point 52*b*, a negative side connection point 52*c*, a positive side thermostat 52*d*, and a negative side thermostat 52*e*.

The heat generating part 52*a* includes a linear carbon fiber. The carbon fiber is curved in a sinuous form at multiple locations. The heat generating part 52*a* includes a first end attached to the positive side connection point 52*b*. The heat generating part 52*a* includes a second end attached to the negative side connection point 52*c*.

The second positive side electric wire 55 includes a first end connected to the positive side connection point 52*b*. The second positive side electric wire 55 includes a second end connected to the power-supply line 60. The second positive side electric wire 55 is bent so as to pass through an area near the positive side connection point 52*b* and an area near the negative side connection point 52*c*.

The positive side thermostat 52*d* is provided to the second positive side electric wire 55 near the positive side connection point 52*b*. The negative side thermostat 52*e* is provided to the second positive side electric wire 55 near the negative side connection point 52*c*.

The second negative side electric wire 58 includes a first end connected to the negative side connection point 52*c*. The second negative side electric wire 58 includes a second end connected to the ground line 61.

In the first embodiment, the third heat generator 53 is provided between an outer fabric and a lining fabric of a not-shown rear body part of the body part 41. In another embodiment, the third heat generator 53 may be provided to a position different from the position between the outer fabric and the lining fabric of the rear body part. The third heat generator 53 includes a heat generating part 53*a*, a positive side connection point 53*b*, a negative side connection point 53*c*, a positive side thermostat 53*d*, and a negative side thermostat 53*e*.

The heat generating part 53*a* includes a linear carbon fiber. The carbon fiber is curved in a sinuous form at multiple locations. The heat generating part 53*a* includes a first end attached to the positive side connection point 53*b*. The heat generating part 53*a* includes a second end attached to the negative side connection point 53*c*.

The third positive side electric wire 56 includes a first end connected to the positive side connection point 53*b*. The third positive side electric wire 56 includes a second end connected to the power-supply line 60. The third positive side electric wire 56 is bent so as to pass through an area near the positive side connection point 53*b* and an area near the negative side connection point 53*c*.

The positive side thermostat 53*d* is provided to the third positive side electric wire 56 near the positive side connection point 53*b*. The negative side thermostat 53*e* is provided to the third positive side electric wire 56 near the negative side connection point 53*c*.

The third negative side electric wire 59 includes a first end connected to the negative side connection point 53*c*, The third negative side electric wire 59 includes a second end connected to the ground line 61.

The body part 41 includes a controller 62. The controller 62 includes a control circuit 71, The control circuit 71 of the first embodiment is in the form of a microcomputer including a CPU 71*a*, a ROM 71*b*, and a RAM 71*c*. Various functions of the control circuit 71 are performed when the CPU 71*a* executes a program stored in a non-transitory tangible storage medium. In the first embodiment, the ROM 71*b* corresponds to the non-transitory tangible storage medium storing such a program. By the CPU 71*a* executing this program, a method(s) corresponding to the program is/are carried out. Some or all of the functions performed by the CPU 71*a* may be achieved by hardware (or a hard-wired circuit(s)). In another embodiment, the control circuit 71 may be in the form of a logic circuit(s) including two or more electrical components. In this case, the control circuit 71 may include an ASIC and/or an ASSP. Alternatively, the control circuit 71 may include a programmable logic device that can configure any logic circuit(s). Examples of such a programmable logic device include a FPGA. The controller 62 may include two or more microcomputers in place of or in addition to the control circuit 71.

The controller 62 includes a switch device 72 on the power-supply line 60. The switch device 72 is switched between an ON-state and an OFF-state in accordance with a command from the control circuit 71. In the ON-state, the switch device 72 completes the power-supply line 60. In the OFF-state, the switch device 72 interrupts the power-supply line 60. The switch device 72 of the first embodiment is in the form of a semiconductor switch. Examples of the semiconductor switch include a field-effect transistor (FET), a bipolar transistor, an insulated gate bipolar transistor (IGBT), and a solid state relay. In another embodiment, the switch device 72 may be in the form of a mechanical relay.

The controller 62 includes a display 74. The display 74 includes an indicator 74a. The indicator 74a of the first embodiment is configured to selectively light up in red, white, or blue. Specifically, the indicator 74a of the first embodiment includes a red LED, a white LED, and a blue LED. In another embodiment, the indicator 74a may include a light source different from the LED. In another embodiment, the indicator 74a may be configured to selectively light up in colors different from red, white, and blue.

The controller 62 includes an overload protection circuit 75 on the ground line 61. The overload protection circuit 75 forcibly stops electrical conduction to the first through third heat generators 51 through 53 when a first condition is fulfilled. The first condition is fulfilled when a value of a current flowing through the ground line 61 exceeds a preset overload threshold.

The body part 41 includes a plug 63. The plug 63 includes a first connection terminal 63a connected to the power-supply line 60. The plug 63 includes a resistor 63d. The plug 63 includes a second connection terminal 63b connected to a first end of the resistor 63d. The plug 63 includes a third connection terminal 63c directly connected to the ground line 61 not through the resistor 63d. The resistor 63d includes a second end connected to the ground line 61.

The resistor 63d has a resistance value corresponding to (or associated with) a model (or type) of the heated jacket 4. In the first embodiment, the heated jacket 4 has a first model and a second model. Hereinafter, the heated jacket 4 of the first model is referred to as a first heated jacket, and the heated jacket 4 of the second model is referred to as a second heated jacket.

The body part 41 includes a cord 64 attached thereto. The cord 64 covers the power-supply line 60 and the ground line 61 between the controller 62 and the plug 63.

As illustrated in FIG. 4, the plug 63 includes an insertion portion 63e protruding so as to be inserted into the recess 13d of the DC connector 13. The first through third connection terminals 63a through 63c of the plug 63 are provided inside the insertion portion 63e.

The cord 64, which is placed inside the battery pocket 46, can be drawn out thereof through the opening 46a.

The heated jacket 4 is configured such that the electrical conduction to the first through third heat generators 51 through 53 start in response to the long press of the manual switch 45 being performed. Subsequently, the electrical conduction to the first through third heat generators 51 through 53 stops in response to the long press of the manual switch 45 being performed again.

The heated jacket 4 is configured to switch operation modes of the heated jacket 4. In the first embodiment, the operation modes can be switched between "a high temperature setting", "a medium temperature setting" and "a low temperature setting". The operation modes are switched to the high temperature setting immediately after the electrical conduction to the first through third heat generators 51 through 53 starts. Subsequently, every time the short press of the manual switch 45 is performed, the operation modes are sequentially switched to the high temperature setting, the medium temperature setting, and the low temperature setting in this order.

In the first embodiment, upon the operation modes being switched to the high temperature setting, the indicator 74a of the display 74 lights up in red. Upon the operation modes being switched to the medium temperature setting, the indicator 74a lights up in white. Upon the operation modes being switched to the low temperature setting, the indicator 74a lights up in blue.

The control circuit 71 outputs a pulse-width modulation (PWM) signal to the switch device 72. The PWM signal has a first duty ratio for the high temperature setting, a second duty ratio for the medium temperature setting, and a third duty ratio for the low temperature setting. In the first embodiment, the first duty ratio is the largest. The second duty ratio is the second largest. The third duty ratio is the smallest. Thus, the heated jacket 4 generates the largest heat in the high temperature setting and the smallest heat in the low temperature setting.

Figure 6:
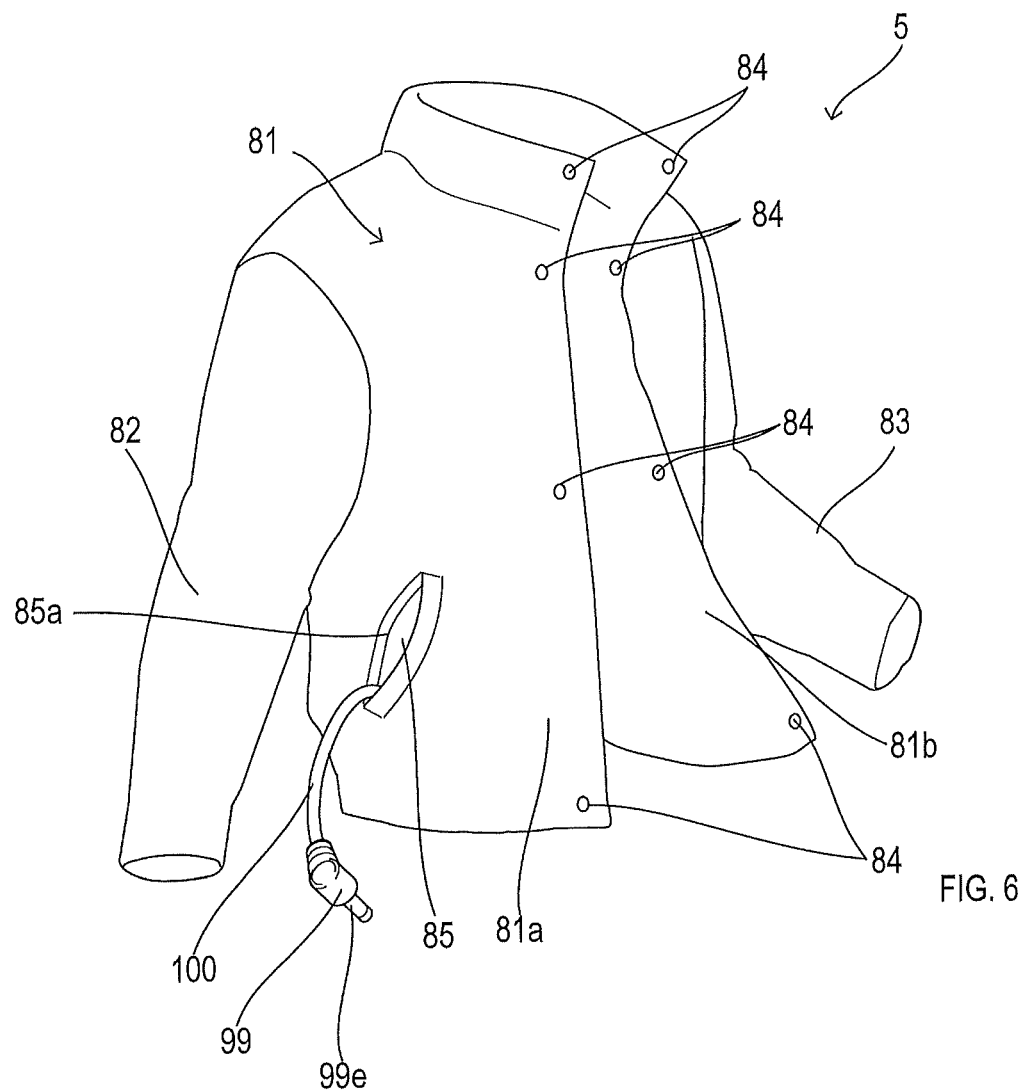
FIG. 6 is a perspective view of a fan jacket.

As illustrated in FIG. 6, the fan jacket 5 of the first embodiment is in the form of an upper garment to cover a body and arms of a wearer. The fan jacket 5 includes a body part 81 to cover the body of the wearer. The body part 81 includes a right-front body part 81a to cover a right side of the front of the body of the wearer. The body part 81 includes a left-front body part 81b to cover a left side of the front of the body of the wearer. The body part 81 includes two or more buttons 84 to couple the left-front body part 81b to the right-front body part 81a, or decouple the left-front body part 81b from the right-front body part 81a.

The body part 81 is provided with a battery pocket 85 to accommodate the battery pack 2 and the battery holder 3 therein. The fan jacket 5 includes a right sleeve 82 to cover the right arm of the wearer. The fan jacket 5 includes a left sleeve 83 to cover the left arm of the wearer.

Figure 7:
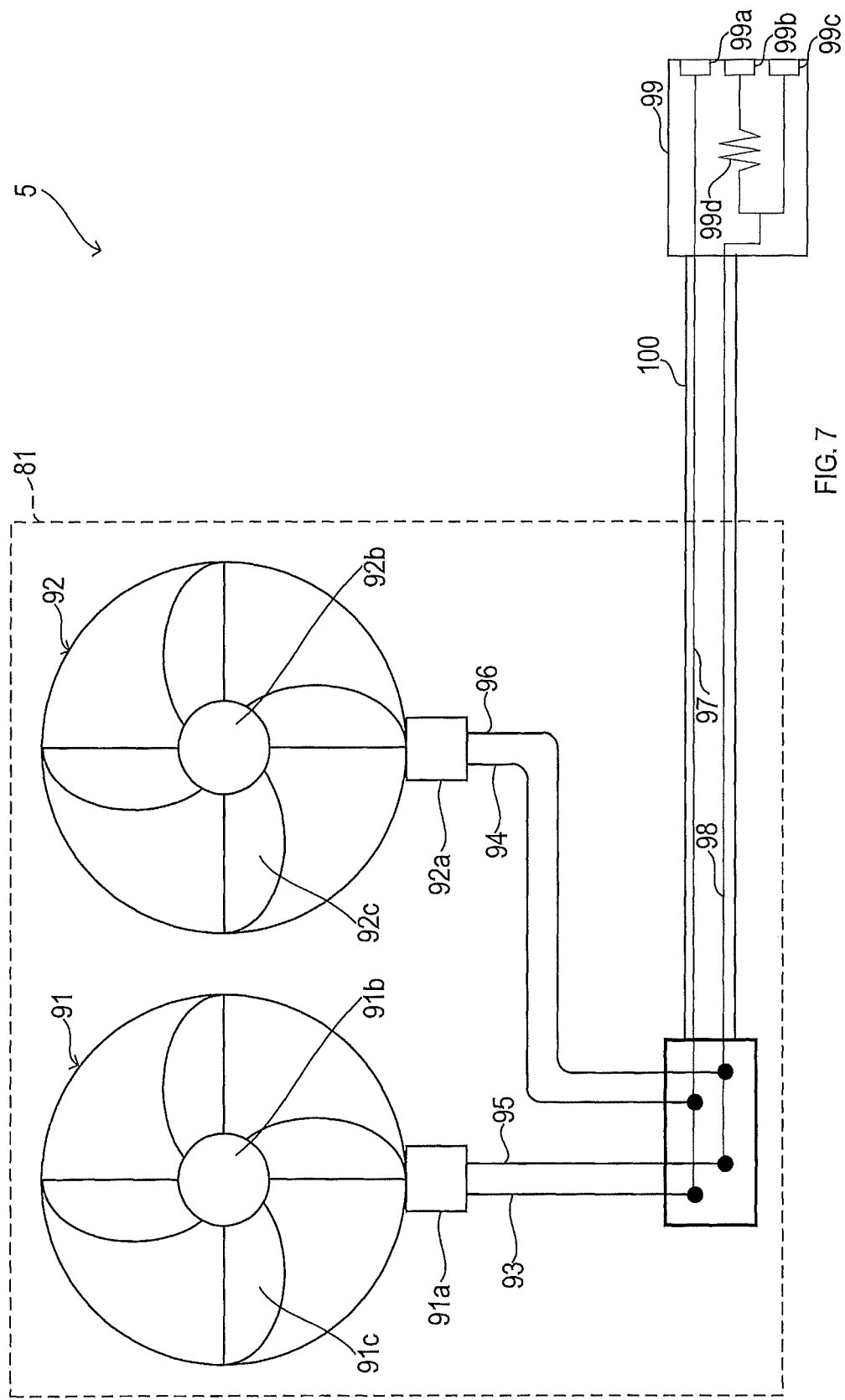
FIG. 7 is a block diagram showing an electrical configuration of the fan jacket.
Figure 8:
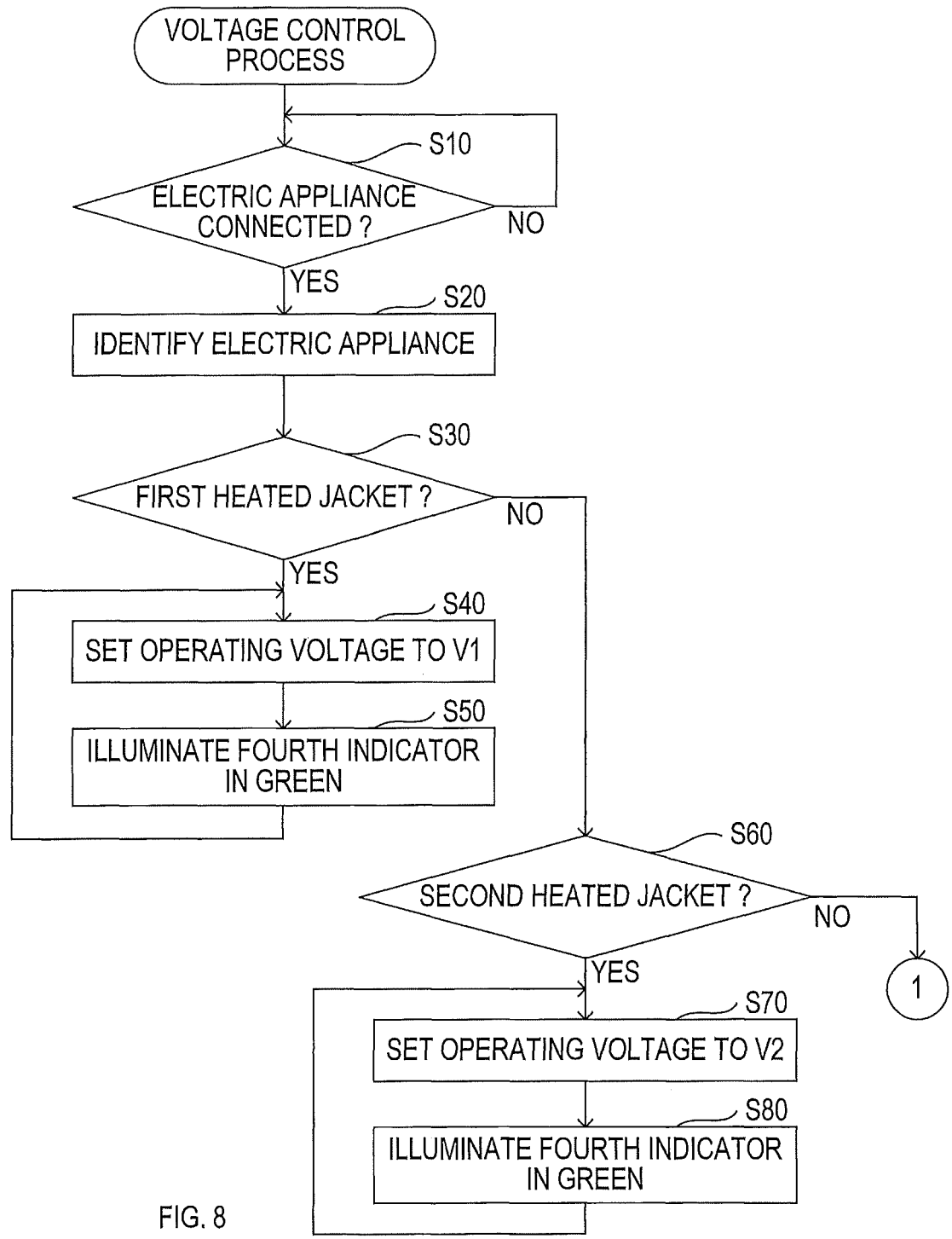
FIG. 8 is a flow chart showing a first part of a voltage control process.
Figure 9:
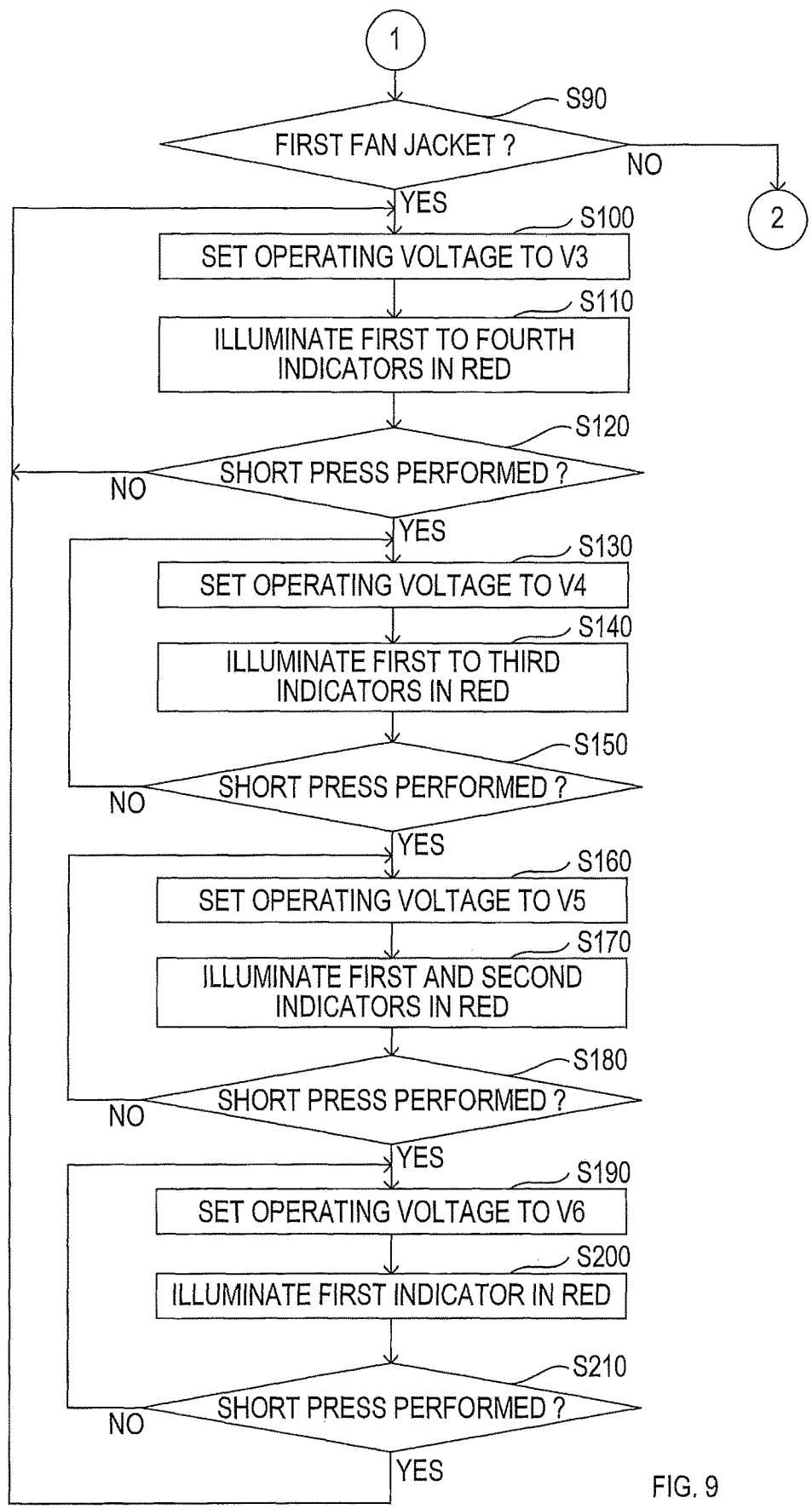
FIG. 9 is a flow chart showing a second part of the voltage control process.
Figure 10:
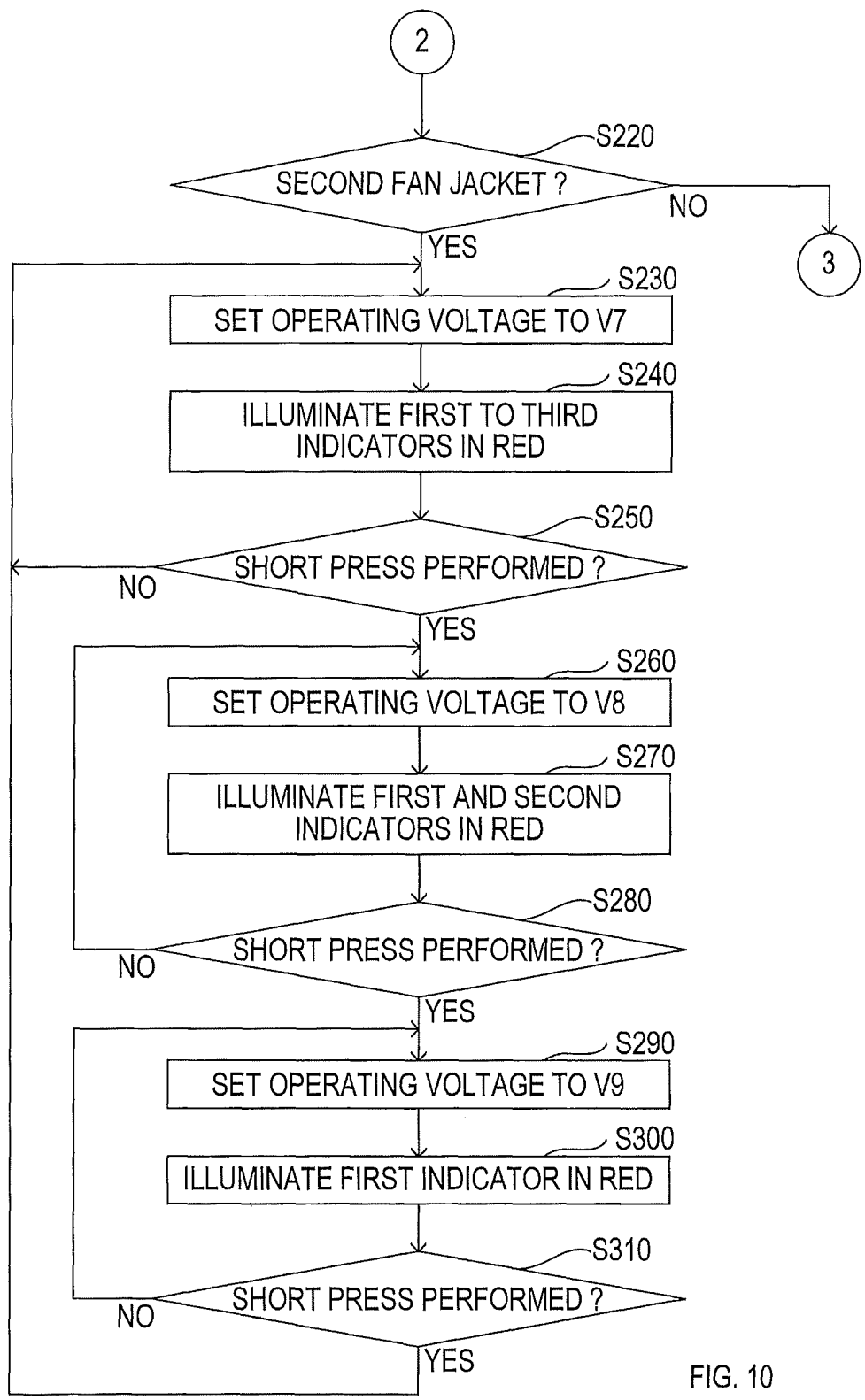
FIG. 10 is a flow chart showing a third part of the voltage control process.
Figure 11:
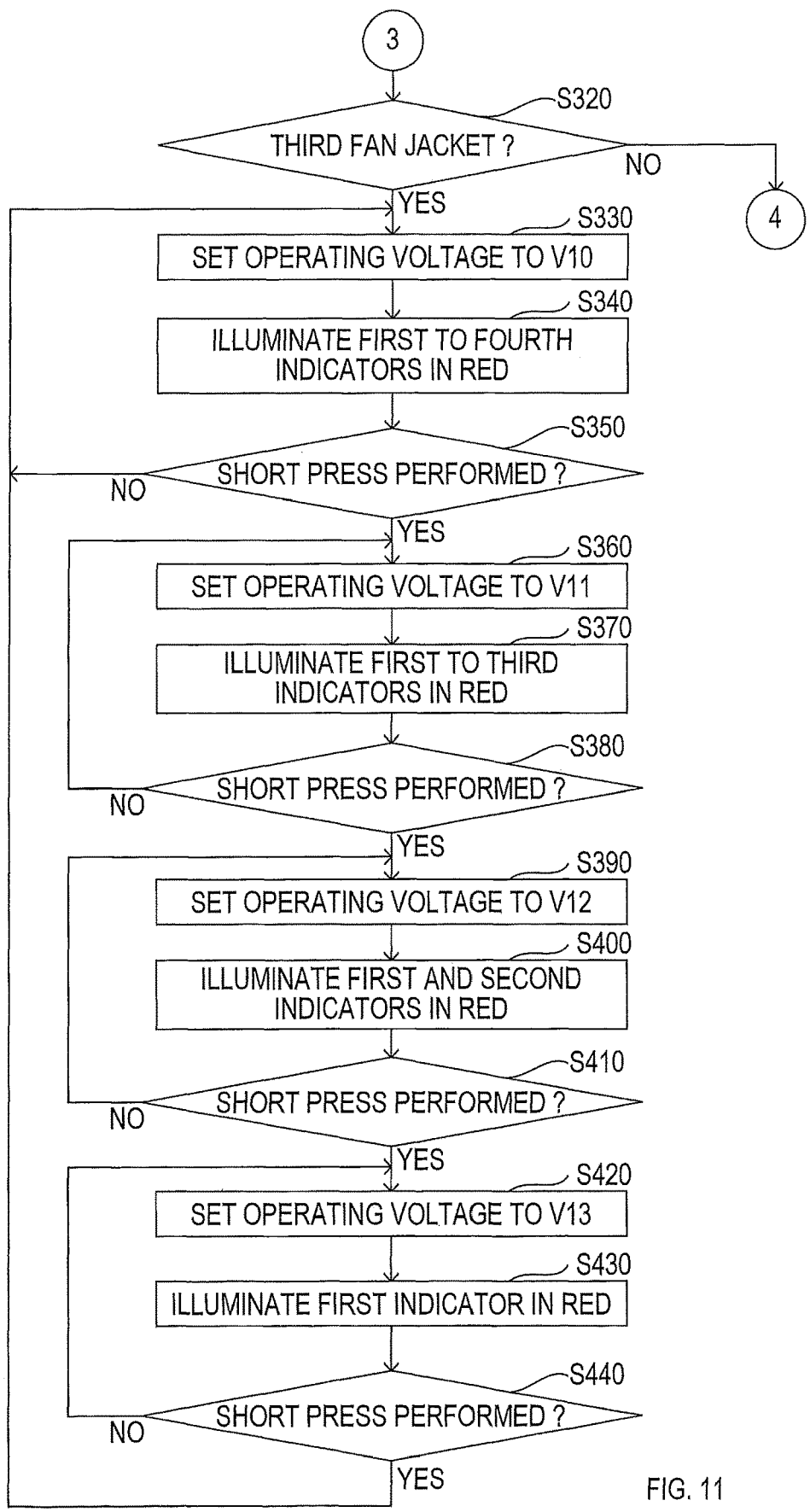
FIG. 11 is a flow chart showing a fourth part of the voltage control process.
Figure 12:
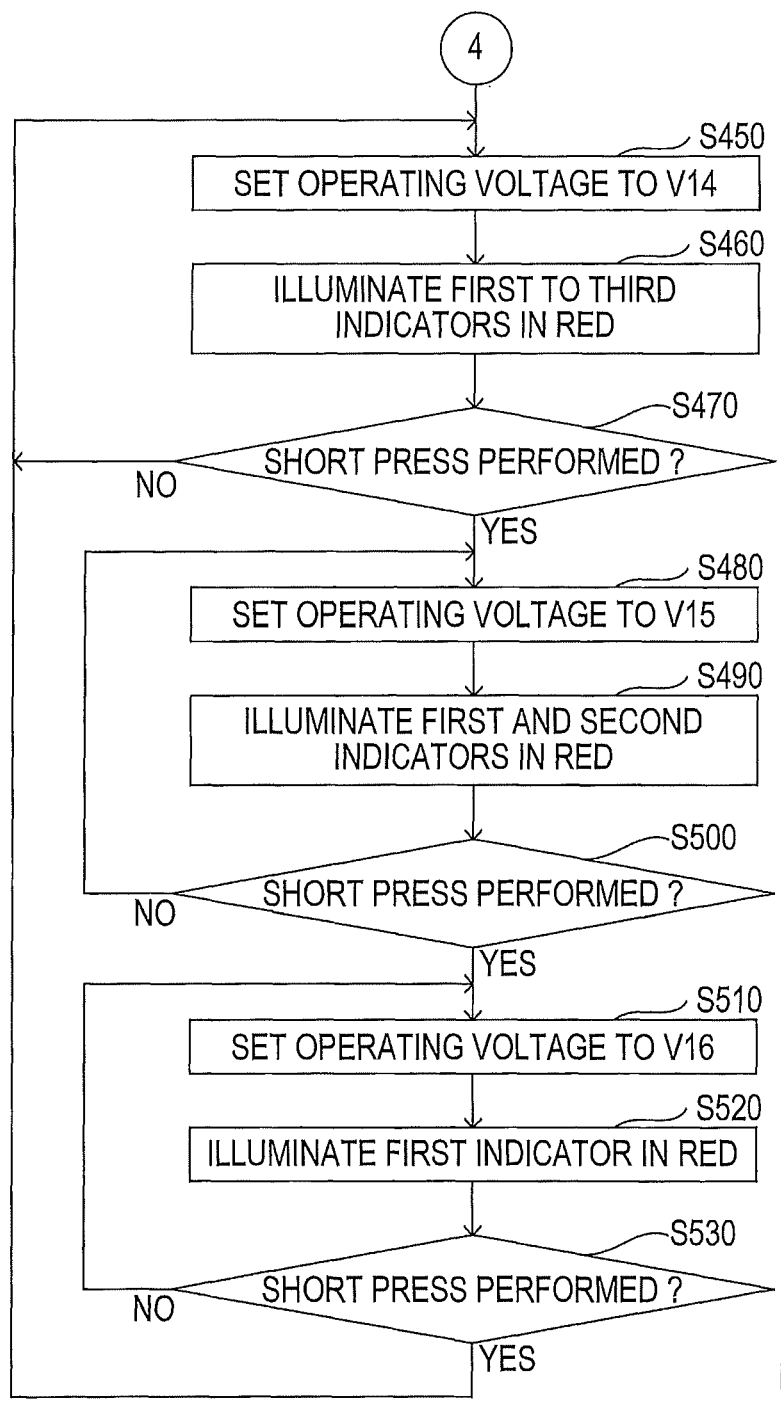
FIG. 12 is a flow chart showing a fifth part of the voltage control process.

As shown in FIG. 7, the body part 81 includes first and second blowers 91, 92, first and second positive side electric wires 93, 94, first and second negative side electric wires 95, 96, a power-supply line 97, and a ground line 98.

The first blower 91 includes a first direct-current (DC) motor 91a and a first fan 91c. The first fan 91c rotates about a first rotation shaft 91b with a driving force of the first DC motor 91a. The second blower 92 includes a second DC motor 92a and a second fan 92c. The second fan 92c rotates about a second rotation shaft 92b with a driving force of the second DC motor 92a. In the first embodiment, the first and second blowers 91, 92 are attached to a not-shown rear body part of the body part 81. In another embodiment, the first blower 91 and/or the second blower 92 may be attached to a position different from the rear body part.

The first positive side electric wire 93 includes a first end connected to a positive terminal of the first DC motor 91a. The first positive side electric wire 93 includes a second end connected to the power-supply line 97. The second positive side electric wire 94 includes a first end connected to a positive terminal of the second DC motor 92a. The second positive side electric wire 94 includes a second end connected to the power-supply line 97.

The first negative side electric wire 95 includes a first end connected to a negative terminal of the first DC motor 91a. The first negative side electric wire 95 includes a second end connected to the ground line 98. The second negative side electric wire 96 includes a first end connected to a negative terminal of the second DC motor 92a. The second negative side electric wire 96 includes a second end connected to the ground line 98.

The body part 81 includes a plug 99. The plug 99 includes a first connection terminal 99a connected to the power-supply line 97. The plug 99 includes a resistor 99d. The plug 99 includes a second connection terminal 99b connected to a first end of the resistor 99d. The plug 99 includes a third connection terminal 99c directly connected to the ground line 98 not through the resistor 99d. The resistor 99d includes a second end connected to the ground line 98.

The resistor 99d has a resistance value corresponding to (or associated with) a model (or type) of the fan jacket 5. In the first embodiment, the fan jacket 5 has first through fourth models. Hereinafter, the fan jacket 5 of the first model is referred to as a first fan jacket; the fan jacket 5 of the second model is referred to as a second fan jacket; the fan jacket 5 of the third model is referred to as a third fan jacket; and the fan jacket 5 of the fourth model is referred to as a fourth fan jacket.

The body part 81 includes a cord 100 attached thereto. The cord 100 covers the power-supply line 97 and the ground line 98.

As illustrated in FIG. 6, the plug 99 includes an insertion portion 99e protruding so as to be inserted into the recess 13d of the DC connector 13. The first through third connection terminals 99a through 99c of the plug 99 are provided inside the insertion portion 99e.

The cord 100, which is placed inside the battery pocket 85, can be drawn out thereof through an opening 85a.

Referring to FIGS. 8 to 12, a description is given to a procedure of a voltage control process (or a power source control process) executed by the CPU 31a of the control circuit 31. The voltage control process is started after the control circuit 31 activates upon receipt of the battery voltage VB.

Upon the voltage control process being executed, the CPU 31a determines whether an electric appliance (or external unit) is connected to the battery holder 3 in S10. Specifically, the CPU 31a determines whether a voltage of the second connection terminal 13b of the DC connector 13 is less than a preset connection threshold. If the voltage of the second connection terminal 13b is less than the connection threshold, then the CPU 31a determines that the electric appliance is connected to the battery holder 3 (S10: YES). If the voltage of the second connection terminal 13b is equal to or higher than the connection threshold, then the CPU 31a determines that the electric appliance is not connected to the battery holder 3 (S10: NO). The electric appliance receives an operating voltage from the battery holder 3. In the first embodiment, the heated jacket 4 and the fan jacket 5 correspond to the electric appliance.

If the electric appliance is not connected to the battery holder 3 (S10: NO), then the CPU 31a repeatedly executes the process of S10, to thereby wait until the electric appliance is connected to the battery holder 3. Upon the electric appliance being connected to the battery holder 3 (S10: YES), the CPU 31a proceeds to S20 to identify the electric appliance connected (hereinafter, referred to as "connected appliance") based on the voltage of the second connection terminal 13b. That is, the CPU 31a determines whether the connected appliance is the first heated jacket, the second heated jacket, the first fan jacket, the second fan jacket, the third fan jacket, or the fourth fan jacket.

In S30, the CPU 31a determines whether the connected appliance is the first heated jacket. If the connected appliance is the first heated jacket (S30: YES), then the CPU 31a sets the magnitude of the operating voltage to a first voltage value V1 (for example, 10.8 V) in S40. Consequently, the DC-to-DC converter 34 outputs the operating voltage having the first voltage value V1.

In S50, the CPU 31a illuminates the fourth indicator 36d in green and proceeds to S40.

In S30, if the connected appliance is not the first heated jacket (S30: NO), then the CPU 31a proceeds to S60. In S60, the CPU 31a determines whether the connected appliance is the second heated jacket. If the connected appliance is the second heated jacket (S60: YES), then the CPU 31a sets the magnitude of the operating voltage to a second voltage value V2 (for example, 12 V) in S70. Consequently, the DC-to-DC converter 34 outputs the operating voltage having the second voltage value V2.

In S80, the CPU 31a illuminates the fourth indicator 36d in green and thereafter proceeds to S70.

In S60, if the connected appliance is not the second heated jacket (S60: NO), then the CPU 31a determines whether the connected appliance is the first fan jacket in S90. If the connected appliance is the first fan jacket (S90: YES), then the CPU 31a sets the magnitude of the operating voltage to a third voltage value V3 (for example, 10.8 V) in S100. Consequently, the DC-to-DC converter 34 outputs the operating voltage having the third voltage value V3.

In S110, the CPU 31a illuminates the first through fourth indicators 36a through 36d in red.

In S120, the CPU 31a determines whether the short press of the manual switch 35 has been performed. If the short press of the manual switch 35 has not been performed (S120: NO), then the CPU 31a proceeds to S100, If the short press of the manual switch 35 has been performed (S120: YES), then the CPU 31a sets the magnitude of the operating voltage to a fourth voltage value V4 (for example, 8.7 V) in S130. Consequently, the DC-to-DC converter 34 outputs the operating voltage having the fourth voltage value V4.

In S140, the CPU 31a illuminates the first through third indicators 36a through 36c in red.

In S150, the CPU 31a determines whether the short press of the manual switch 35 has been performed. If the short press of the manual switch 35 has not been performed (S150: NO), then the CPU 31a proceeds to S130. If the short press of the manual switch 35 has been performed (S150: YES), then the CPU 31a sets the magnitude of the operating voltage to a fifth voltage value V5 (for example, 6.6 V) in S160. Consequently, the DC-to-DC converter 34 outputs the operating voltage having the fifth voltage value V5.

In S170, the CPU 31a illuminates the first and second indicators 36a, 36b in red.

In S180, the CPU 31a determines whether the short press of the manual switch 35 has been performed. If the short press of the manual switch 35 has not been performed (S180: NO), then the CPU 31a proceeds to S160. If the short press of the manual switch 35 has been performed (S180: YES), then the CPU 31a sets the magnitude of the operating voltage to a sixth voltage value V6 (for example, 4.5 V) in S190. Consequently, the DC-to-DC converter 34 outputs the operating voltage having the sixth voltage value V6.

In S200, the CPU 31a illuminates the first indicator 36a in red.

In S210, the CPU 31a determines whether the short press of the manual switch 35 has been performed. If the short press of the manual switch 35 has not been performed (S210: NO), then the CPU 31a proceeds to S190. If the short press of the manual switch 35 has been performed (S210: YES), then the CPU 31a proceeds to S100.

In S90, if the connected appliance is not the first fan jacket (S90: NO), then the CPU 31a determines whether the connected appliance is the second fan jacket in S220. If the connected appliance is the second fan jacket (S220: YES), then the CPU 31a sets the magnitude of the operating voltage to a seventh voltage value V7 (for example, 8.7 V) in S230. Consequently, the DC-to-DC converter 34 outputs the operating voltage having the seventh voltage value V7.

In S240, the CPU 31a illuminates the first through third indicators 36a through 36c in red.

In S250, the CPU 31a determines whether the short press of the manual switch 35 has been performed. If the short press of the manual switch 35 has not been performed (S250: NO), then the CPU 31a proceeds to S230. If the short press of the manual switch 35 has been performed (S250: YES), then the CPU 31a sets the magnitude of the operating voltage to an eighth voltage value V8 (for example, 6.6 V) in S260. Consequently, the DC-to-DC converter 34 outputs the operating voltage having the eighth voltage value V8.

In S270, the CPU 31a illuminates the first and second indicators 36a, 36b in red.

In S280, the CPU 31a determines whether the short press of the manual switch 35 has been performed. If the short press of the manual switch 35 has not been performed (S280: NO), then the CPU 31a proceeds to S260. If the short press of the manual switch 35 has been performed (S280: YES), then the CPU 31a sets the magnitude of the operating voltage to a ninth voltage value V9 (for example, 4.5 V) in S290. Consequently, the DC-to-DC converter 34 outputs the operating voltage having the ninth voltage value V9.

In S300, the CPU 31a illuminates the first indicator 36a in red.

In S310, the CPU 31a determines whether the short press of the manual switch 35 has been performed. If the short press of the manual switch 35 has not been performed (S310: NO), then the CPU 31a proceeds to S290. If the short press of the manual switch 35 has been performed (S310: YES), then the CPU 31a proceeds to S230.

In S220, if the connected appliance is not the second fan jacket (S220: NO), then the CPU 31a determines whether the connected appliance is the third fan jacket in S320.

If the connected appliance is the third fan jacket (S320: YES), then the CPU 31a sets the magnitude of the operating voltage to a tenth voltage value V10 (for example, 7.6 V) in S330. Consequently, the DC-to-DC converter 34 outputs the operating voltage having the tenth voltage value V10.

In S340, the CPU 31a illuminates the first through fourth indicators 36a through 36d in red.

In S350, the CPU 31a determines whether the short press of the manual switch 35 has been performed. If the short press of the manual switch 35 has not been performed (S350: NO), then the CPU 31a proceeds to S330. If the short press of the manual switch 35 has been performed (S350: YES), then the CPU 31a sets the magnitude of the operating voltage to an eleventh voltage value V11 (for example, 6.9 V) in S360. Consequently, the DC-to-DC converter 34 outputs the operating voltage having the eleventh voltage value V11.

In S370, the CPU 31a illuminates the first through third indicators 36a through 36c in red.

In S380, the CPU 31a determines whether the short press of the manual switch 35 has been performed. If the short press of the manual switch 35 has not been performed (S380: NO), then the CPU 31a proceeds to S360. If the short press of the manual switch 35 has been performed (S380: YES), then the CPU 31a sets the magnitude of the operating voltage to a twelfth voltage value V12 (for example, 5.2 V) in S390. Consequently, the DC-to-DC converter 34 outputs the operating voltage having the twelfth voltage value V12.

In S400, the CPU 31a illuminates the first and second indicators 36a, 36b in red.

In S410, the CPU 31a determines whether the short press of the manual switch 35 has been performed. If the short press of the manual switch 35 has not been performed (S410: NO), then the CPU 31a proceeds to 8390. If the short press of the manual switch 35 has been performed (S410: YES), then the CPU 31a sets the magnitude of the operating voltage to a thirteenth voltage value V13 (for example, 4.5 V) in S420. Consequently, the DC-to-DC converter 34 outputs the operating voltage having the thirteenth voltage value V13.

In S430, the CPU 31a illuminates the first indicator 36a in red.

In S440, the CPU 31a determines whether the short press of the manual switch 35 has been performed. If the short press of the manual switch 35 has not been performed (S440: NO), then the CPU 31a proceeds to S420. If the short press of the manual switch 35 has been performed (S440: YES), then the CPU 31a proceeds to S330.

In S320, if the connected appliance is not the third fan jacket (S320: NO), then the CPU 31a determines that the connected appliance is the fourth fan jacket. In S450, the CPU 31a sets the magnitude of the operating voltage to a fourteenth voltage value V14 (for example, 6.9 V), Consequently, the DC-to-DC converter 34 outputs the operating voltage having the fourteenth voltage value V14.

In S460, the CPU 31a illuminates the first through third indicators 36a through 36c in red.

In S470, the CPU 31a determines whether the short press of the manual switch 35 has been performed. If the short press of the manual switch 35 has not been performed (S470: NO), then the CPU 31a proceeds to S450. If the short press of the manual switch 35 has been performed, (S470: YES), then the CPU 31a sets the magnitude of the operating voltage to a fifteenth voltage value V15 (for example, 5.2 V) in S480. Consequently, the DC-to-DC converter 34 outputs the operating voltage having the fifteenth voltage value V15.

In S490, the CPU 31a illuminates the first and second indicators 36a, 36b in red.

In S500, the CPU 31a determines whether the short press of the manual switch 35 has been performed. If the short press of the manual switch 35 has not been performed (S500: NO), then the CPU 31a proceeds to S480. If the short press of the manual switch 35 has been performed (S500: YES), then the CPU 31a sets the magnitude of the operating voltage to a sixteenth voltage value V16 (for example, 4.5 V) in S510. Consequently, the DC-to-DC converter 34 outputs the operating voltage having the sixteenth voltage value V16.

In S520, the CPU 31a illuminates the first indicator 36a in red.

In S530, the CPU 31a determines whether the short press of the manual switch 35 has been performed. If the short press of the manual switch 35 has not been performed (S530: NO), then the CPU 31a proceeds to S510. If the short press of the manual switch 35 has been performed (S530: YES), then the CPU 31a proceeds to S450.

That is, the control circuit 31 disables the manual operation applied to the manual switch 35 when the connected appliance is the heated jacket 4. Furthermore, when the connected appliance is the heated jacket 4, the control circuit 31 controls the DC-to-DC converter 34 so as to output the operating voltage having a fixed voltage value (that is, the first voltage value V1 or the second voltage value V2). More specifically, the control circuit 31 fixes the magnitude of the operating voltage to the first voltage value V1 when the first heated jacket is connected to the battery holder 3. The control circuit 31 fixes the magnitude of the operating voltage to the second voltage value V2 when the second heated jacket is connected to the battery holder 3.

The control circuit 31 enables the manual operation applied to the manual switch 35 when the connected appliance is the fan jacket 5.

More specifically, the control circuit 31 sets the maximum value of the operating voltage to the third voltage value V3 when the first fan jacket is connected to the battery holder 3. The control circuit 31 sets the maximum value of the operating voltage to the seventh voltage value V7 when the second fan jacket is connected to the battery holder 3. The control circuit 31 sets the maximum value of the operating voltage to the tenth voltage value V10 when the third fan jacket is connected to the battery holder 3. The control circuit 31 sets the maximum value of the operating voltage to the fourteenth voltage value V14 when the fourth fan jacket is connected to the battery holder 3.

When the fan jacket 5 is connected to the battery holder 3, the control circuit 31 varies the total number of voltage values of the operating voltage that is selectable to a user of the battery holder 3 in accordance with the model of the fan jacket 5. More specifically, when the first fan jacket or the third fan jacket is connected to the battery holder 3, four voltage values are selectable to the user. When the second fan jacket or the fourth fan jacket is connected to the battery holder 3, three voltage values are selectable to the user.

As described above, the battery holder 3 can control the magnitude of the operating voltage so as to conform to both the heated jacket 4 and the fan jacket 5. Thus, the battery holder 3 is usable for both the heated jacket 4 and the fan jacket 5. Consequently, the battery holder 3 can improve convenience for the user of the heated jacket 4 and the fan jacket 5.

As described above, the battery holder 3 can identify the connected appliance by such a simple way of detecting the voltage across the resistor 63d or the resistor 99d.

In the first embodiment described above, the battery holder 3 corresponds to one example of the voltage control device in the present disclosure. The battery 21 corresponds to one example of the direct-current power source in the present disclosure. The heated jacket 4 corresponds to one example of the first electric appliance in the present disclosure. The fan jacket 5 corresponds to one example of the second electric appliance in the present disclosure. The DC connector 13 corresponds to one example of the appliance connector.

Furthermore, the DC-to-DC converter 34 corresponds to one example of the voltage output circuit in the present disclosure. The control circuit 31 corresponds to one example of the controller in the present disclosure.

The plug 63 corresponds to one example of the first connection plug in the present disclosure. The plug 99 corresponds to one example of the second connection plug in the present disclosure.

The heated jacket 4 corresponds to one example of the heated garment in the present disclosure. The fan jacket 5 corresponds to one example of the garment with a fan in the present disclosure.

Second Embodiment

The second embodiment will be described focusing on a difference(s) from the first embodiment described above. In the second embodiment, the same numeral references as in the first embodiment indicate the same configurations as those in the first embodiment, and descriptions of such configurations will be omitted.

Figure 13:
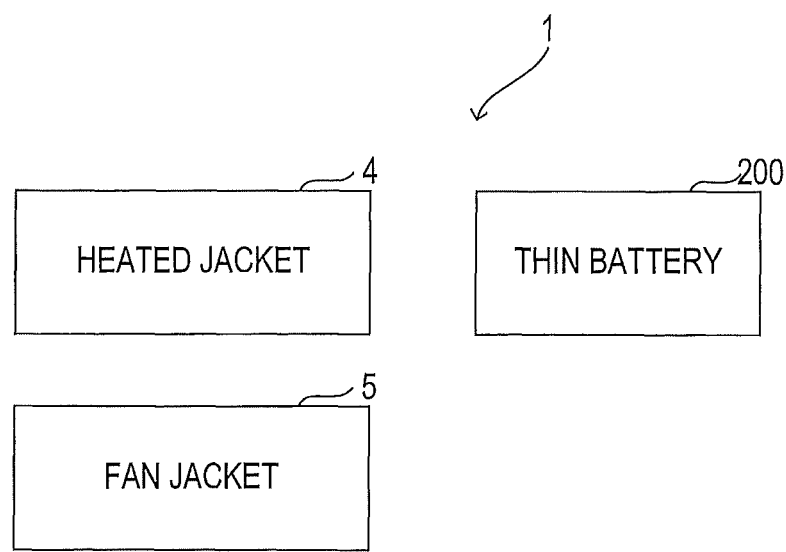
FIG. 13 is a block diagram showing a configuration of a system according to a second embodiment.

As shown in FIG. 13, the system 1 of the second embodiment is different from the system 1 of the first embodiment in that a thin battery 200 is provided in place of the battery pack 2 and the battery holder 3.

Figure 14:
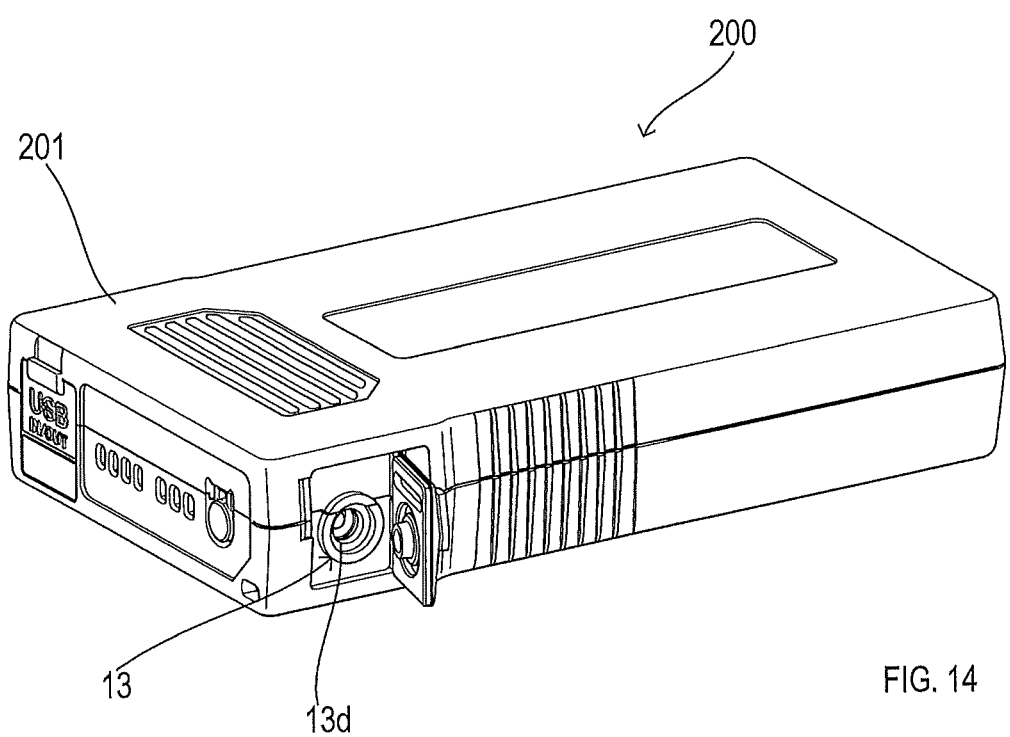
FIG. 14 is a perspective view of a thin battery.

As illustrated in FIG. 14, the thin battery 200 includes a casing 201 and the DC connector 13.

The casing 201 has a component(s) of the thin battery 200 accommodated therein. The DC connector 13 is provided to a surface of the casing 201.

Figure 15:
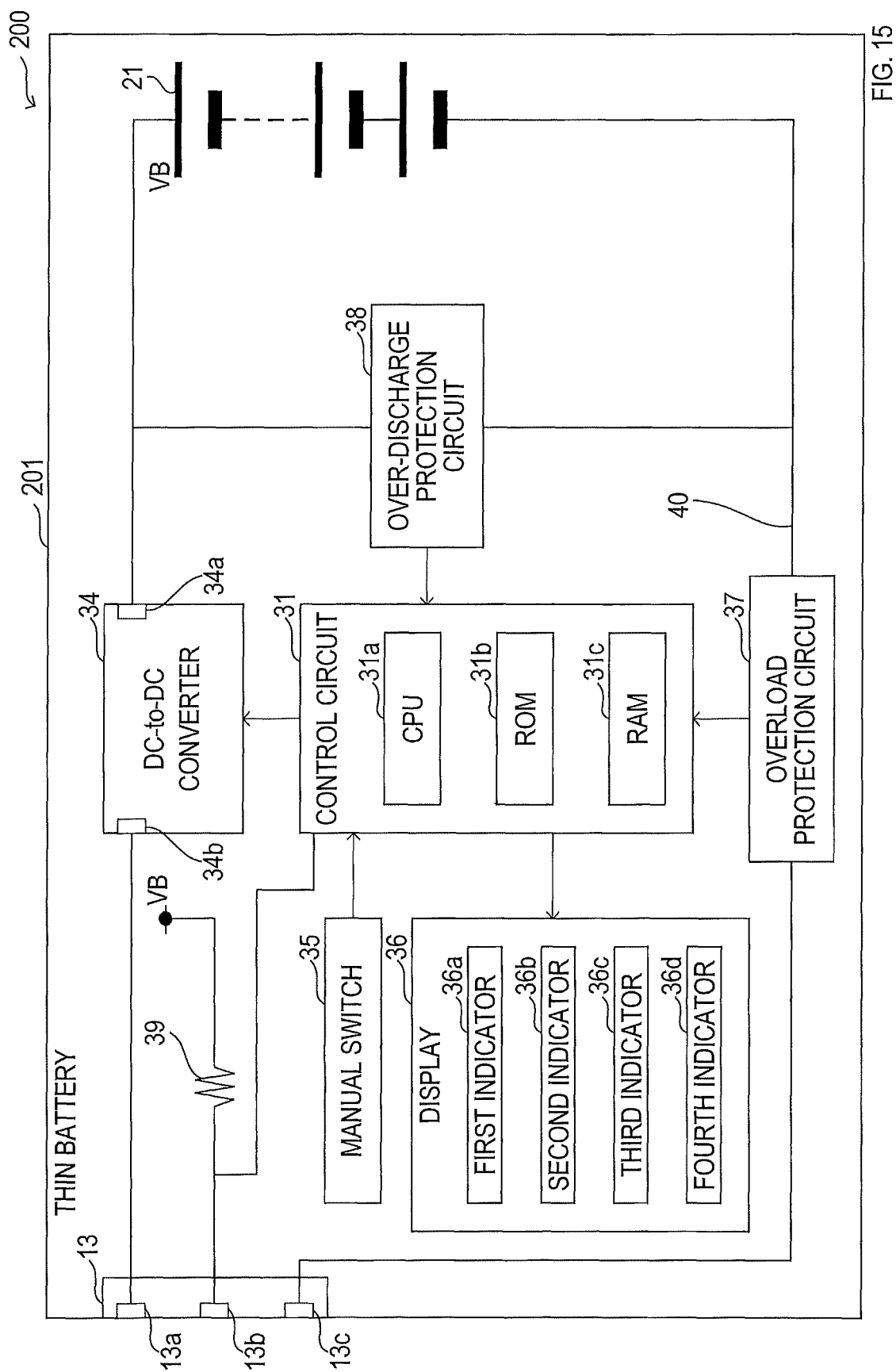
FIG. 15 is a block diagram showing an electrical configuration of the thin battery.

As shown in FIG. 15, the thin battery 200 is different from the battery holder 3 of the first embodiment in that the battery 21 is provided in addition to the DC connector 13, the control circuit 31, the DC-to-DC converter 34, the manual switch 35, the display 36, the overload protection circuit 37, the over-discharge protection circuit 38, and the resistor 39.

The DC connector 13, the battery 21, the control circuit 31, the DC-to-DC converter 34, the manual switch 35, the display 36, the overload protection circuit 37, the over-discharge protection circuit 38, and the resistor 39 are accommodated inside the casing 201. The voltage input terminal 34a of the DC-to-DC converter 34 is connected to the positive electrode of the battery 21. The overload protection circuit 37 is provided on the ground line 40 between the third connection terminal 13c and the negative electrode of the battery 21.

The thin battery 200 described above operates similarly to the battery holder 3 of the first embodiment. That is, the thin battery 200 can control the magnitude of the operating voltage so as to conform to both the heated jacket 4 and the fan jacket 5. Thus, the thin battery 200 is usable for both the heated jacket 4 and the fan jacket 5. Consequently, the thin battery 200 can improve convenience for the user of the heated jacket 4 and the fan jacket 5.

In the second embodiment described above, the thin battery 200, corresponds to one example of the voltage control device in the present disclosure. The battery 21 corresponds to one example of the direct-current power source in the present disclosure. The heated jacket 4 corresponds to one example of the first electric appliance in the present disclosure. The fan jacket 5 corresponds to one example of the second electric, appliance in the present disclosure.

Third Embodiment

The third embodiment will be described focusing on a difference(s) from the first embodiment described above. In the third embodiment, the same numeral references as in the first embodiment indicate the same configurations as those in the first embodiment, and descriptions of such configurations will be omitted.

Figure 16:
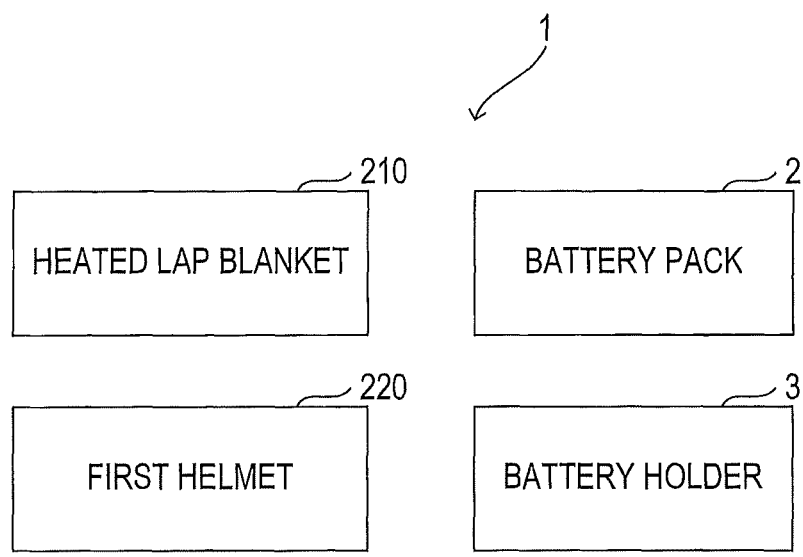
FIG. 16 is a block diagram showing a configuration of a system according to a third embodiment.

As shown in FIG. 16, the system 1 of the third embodiment is different from the system 1 of the first embodiment in that (i) a heated lap blanket 210 is provided in place of the heated jacket 4 and (ii) a first helmet 220 is provided in place of the fan jacket 5. As in the first embodiment, the system 1 of the third embodiment includes the battery pack 2 and the battery holder 3.

As in the heated jacket 4 of the first embodiment, the heated lap blanket 210 includes the first through third heat generators 51 through 53, the first through third positive side electric wires 54 through 56, the first through third negative side electric wires 57 through 59, the power-supply line 60, the ground line 61, the controller 62, the plug 63, and the cord 64.

The heated lap blanket 210 is different from the heated jacket 4 of the first embodiment in that the heated lap blanket 210 has the first through third heat generators 51 through 53 mounted therein.

As in the fan jacket 5 of the first embodiment, the first helmet 220 includes the first and second blowers 91, 92, the first and second positive side electric wires 93, 94, the first and second negative side electric wires 95, 96, the power-supply line 97, the ground line 98, the plug 99, and the cord 100.

Figure 17:
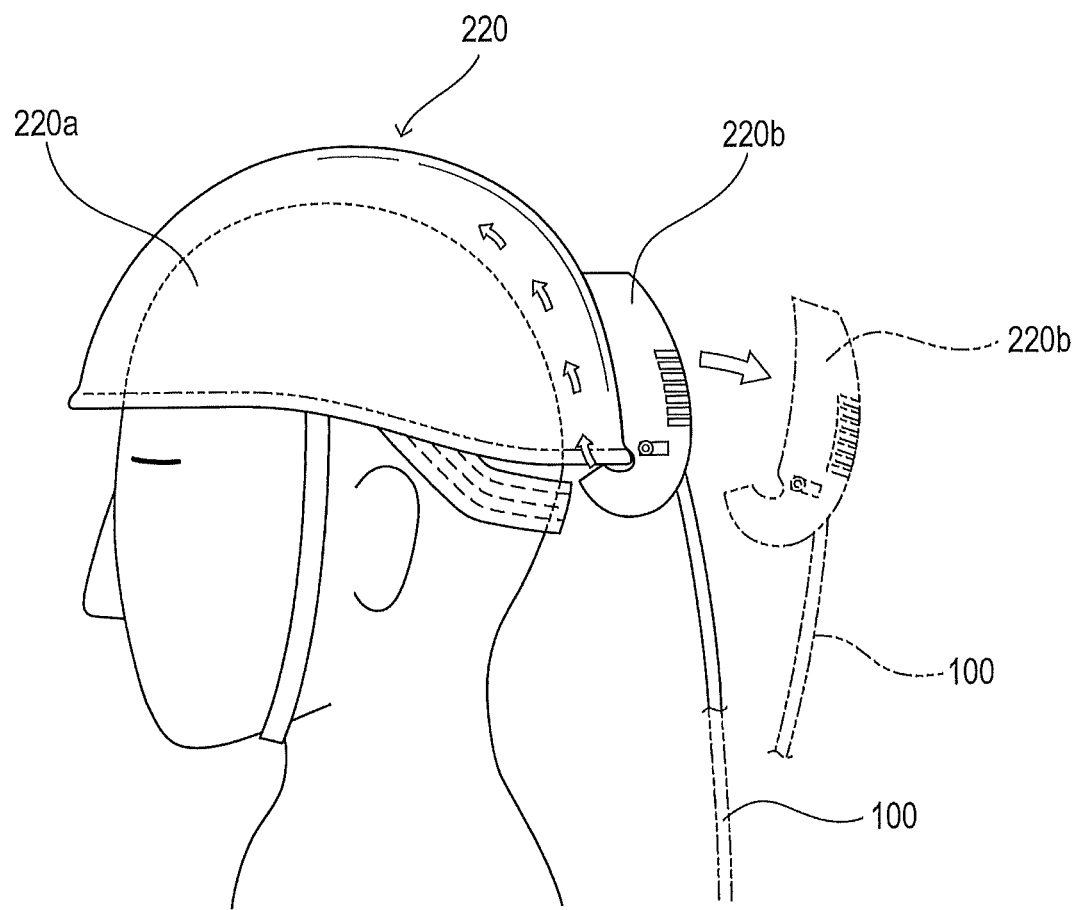
FIG. 17 shows a schematic configuration of a helmet according to the third embodiment.

The first helmet 220 is different from the fan jacket 5 of the first embodiment in that the first and second blowers 91, 92 are attached to a helmet main body. As shown in FIG. 17, in the third embodiment, the first helmet 220 includes a helmet main body 220a and an adapter 220b. The adapter 220b is configured to be detachably attached to the helmet main body 220a. The adapter 220b has the first and second blowers 91, 92, the first and second positive side electric wires 93, 94, the first and second negative side electric wires 95, 96, the power-supply line 97, and the ground line 98 accommodated therein. In another embodiment, the first and second blowers 91, 92 may be unremovably fixed to or integrated into the helmet main body 220a.

The DC connector 13 of the battery holder 3 is selectively connected to the heated lap blanket 210 or the first helmet 220.

The manual switch 35 is operated by the user of the battery holder 3 so as to control the first and second blowers 91, 92.

When the heated lap blanket 210 is connected to the battery holder 3, the control circuit 31 disables the manual operation applied to the manual switch 35 and fixes the magnitude of the operating voltage. When the first helmet 220 is connected to the battery holder 3, the control circuit 31 enables the manual operation applied to the manual switch 35.

As described above, the battery holder 3 can control the magnitude of the operating voltage so as to conform to both the heated lap blanket 210 and the first helmet 220, Thus, the battery holder 3 is usable for both the heated lap blanket 210 and the first helmet 220. Consequently, the battery holder 3 can improve convenience for a user of the heated lap blanket 210 and the first helmet 220.

In the third embodiment, the heated lap blanket 210 corresponds to one example of the first electric appliance in the present disclosure. The first helmet 220 corresponds to one example of the second electric appliance and the helmet with a fan in the present disclosure.

Fourth Embodiment

The fourth embodiment will be described focusing on a difference(s) from the first embodiment described above. In the fourth embodiment, the same numeral references as in the first embodiment indicate the same configurations as those in the first embodiment, and descriptions of such configurations will be omitted.

Figure 18:
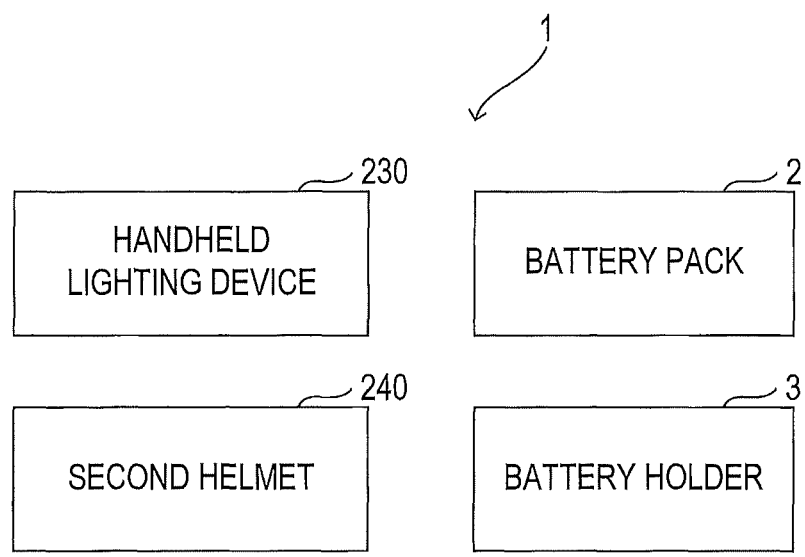
FIG. 18 is a block diagram showing a configuration of a system according to a fourth embodiment.

As shown in FIG. 18, the system 1 of the fourth embodiment is different from the system 1 of the first embodiment in that (i) a handheld lighting device 230 is provided in place of the heated jacket 4 and (ii) a second helmet 240 is provided in place of the fan jacket 5. As in the first embodiment, the system 1 of the fourth embodiment includes the battery pack 2 and the battery holder 3.

Figure 19:
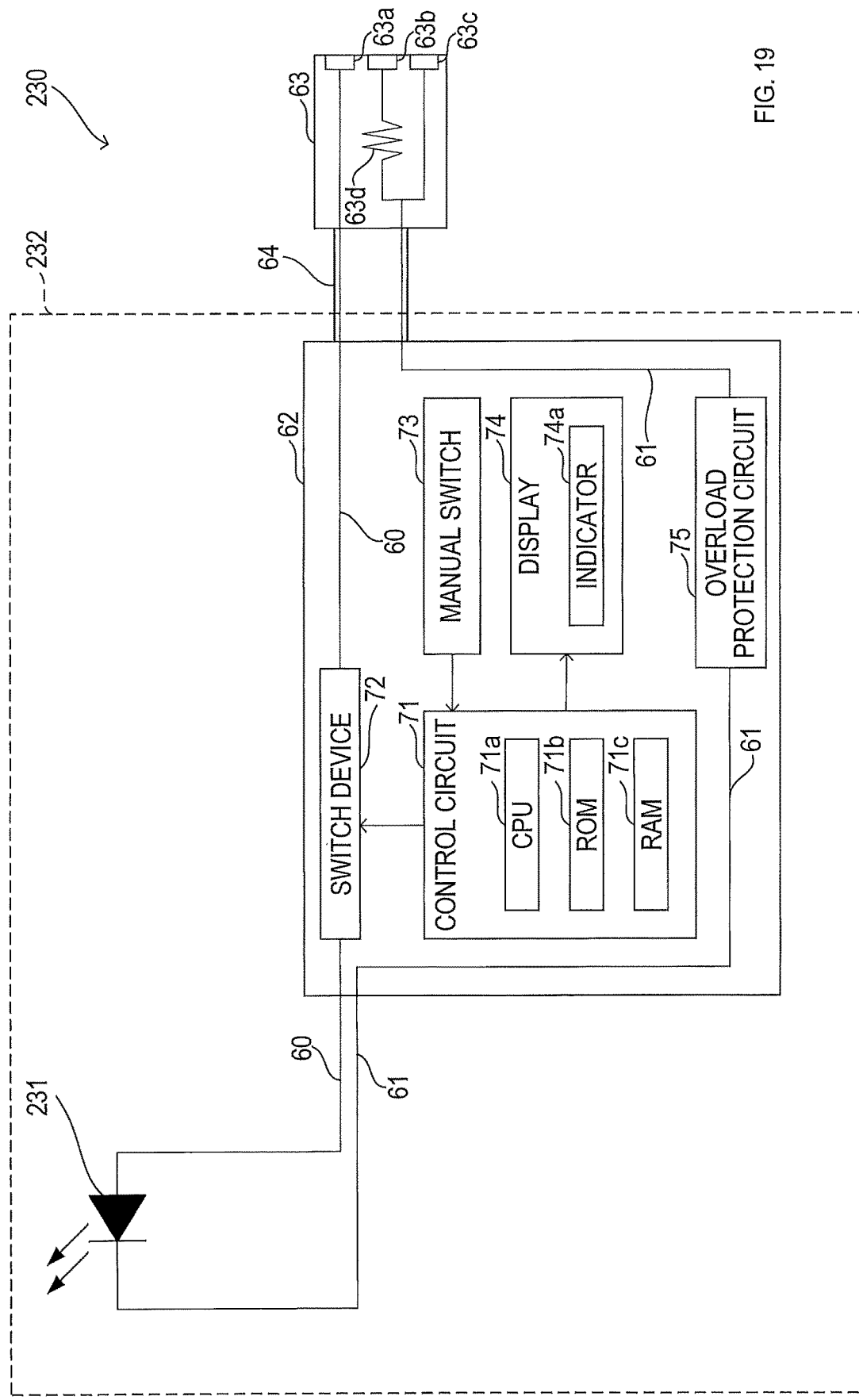
FIG. 19 is a block diagram showing an electrical configuration of a handheld lighting device.

As shown in FIG. 19, the handheld lighting device 230 is different from the heated jacket 4 of the first embodiment in that (i) the first through third heat generators 51 through 53, the first through third positive side electric wires 54 through 56, and the first through third negative side electric wires 57 through 59 are omitted and (ii) an LED light 231 is added.

The LED light 231 includes an anode connected to the power-supply line 60. The LED light 231 includes a cathode connected to the ground line 61. The LED light 231 and the controller 62 are accommodated inside a casing 232 of the handheld lighting device 230.

Figure 20:
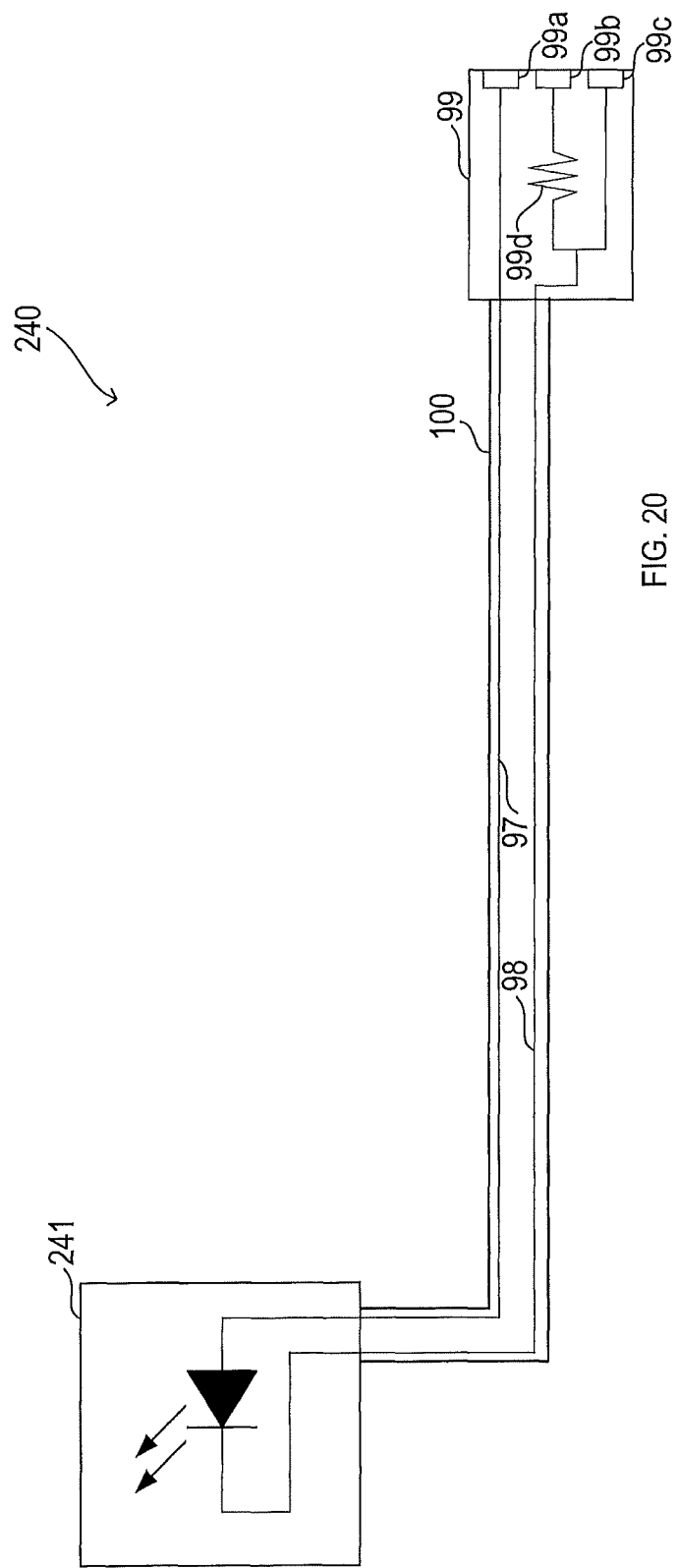
FIG. 20 is a block diagram showing an electrical configuration of a helmet with a light.

As shown in FIG. 20, the second helmet 240 is different from the fan jacket 5 of the first embodiment in that (i) the first and second blowers 91, 92, the first and second positive side electric wires 93, 94, and the first and second negative side electric wires 95, 96 are omitted and (ii) an LED light 241 is added.

The LED light 241 includes an anode connected to the power-supply line 97. The LED light 241 includes a cathode connected to the ground line 98. The LED light 241 is attached to a not-shown helmet main body. The cord 100 covers the power-supply line 97 and the ground line 98 between the LED light 241 and the plug 99.

The DC connector 13 is selectively connected to the handheld lighting device 230 or the second helmet 240.

The manual switch 35 is manually operated by a user of the second helmet 240 so as to control the LED light 241.

When the handheld lighting device 230 is connected to the battery holder 3, the control circuit 31 disables the manual operation applied to the manual switch 35 and fixes the magnitude of the operating voltage. When the second helmet 240 is connected to the battery holder 3, the control circuit 31 enables the manual operation applied to the manual switch 35.

As described above, the battery holder 3 can control the magnitude of the operating voltage so as to conform to both the handheld lighting device 230 and the second helmet 240. Thus, the battery holder 3 is usable for both the handheld lighting device 230 and the second helmet 240. Consequently, the battery holder 3 can improve convenience for the user of the handheld lighting device 230 and the second helmet 240.

In the fourth embodiment, the handheld lighting device 230 corresponds to one example of the first electric appliance in the present disclosure. The second helmet 240 corresponds to one example of the second electric appliance in the present disclosure. The LED lights 231, 241 correspond to one example of the lighting appliance in the present disclosure.

Although the embodiments of the present disclosure have been described hereinabove, the present disclosure is not limited to the above-described embodiments and may be practiced in various forms.

For example, in the first embodiment described above, the heated jacket 4 and the fan jacket 5 are in the form of an upper garment with a sleeve to cover the body and the arms of the wearer. The first embodiment may replace the heated jacket 4 with a heated vest, which is a sleeveless upper garment. Additionally or alternatively, the first embodiment may replace the fan jacket 5 with a fan vest, which is a sleeveless upper garment.

In the first embodiment, the manual operation applied to the manual switch 35 is disabled for the heated jacket 4, whereas the manual operation applied to the manual switch 35 is enabled for the fan jacket 5, In the first embodiment, the manual operation applied to the manual switch 35 may be disabled for the fan jacket 5. Furthermore, the manual operation applied to the manual switch 35 may be enabled for the heated jacket 4.

Two or more functions of one element of the aforementioned embodiments may be achieved by two or more elements, and one function of one element may be achieved by two or more elements. Furthermore, two or more functions of two or more elements may be achieved by one element, and one function achieved by two or more elements may be achieved by one element. Furthermore, a part of the configurations of the aforementioned embodiments may be omitted. Still further, at least a part of the configurations of the aforementioned embodiments may be added to or replaced with the configurations of the other above-described embodiments.

In addition to the battery holder 3 and the thin battery 200 described above, the present disclosure may also be practiced in various forms, such as a program for causing a computer to function as the control circuit 31, a non-transitory tangible storage medium, such as a semiconductor memory, in which this program is stored, or a method for controlling a voltage.

What is claimed is:

1. A voltage control device comprising:
   an appliance connector configured to be selectively connected to a first electric appliance or a second electric appliance;
   a voltage output circuit configured to (i) receive a direct voltage from a direct-current power source and (ii) output an operating voltage based on the direct voltage, the operating voltage being variable;
   a manual switch configured to be manually operated by a user of the voltage control device; and
   a controller configured to:
   (i) control, in response to the first electric appliance being connected to the appliance connector, the voltage output circuit so as to fix the operating voltage; and
   (ii) control, in response to the second electric appliance being connected to the appliance connector, the voltage output circuit so as to vary the operating voltage in accordance with a manual operation applied to the manual switch.

2. The voltage control device according to claim 1,
   wherein the first electric appliance corresponds to a first model of the first electric appliance or a second model of the first electric appliance, and
   wherein the controller is configured to:
   (i) control, in response to the first model of the first electric appliance being connected to the appliance connector, the voltage output circuit so as to fix the operating voltage to a first voltage; and
   (ii) control, in response to the second model of the first electric appliance being connected to the appliance connector, the voltage output circuit so as to fix the operating voltage to a second voltage, and the second voltage being distinct from the first voltage.

3. The voltage control device according to claim 1,
   wherein the second electric appliance corresponds to a first model of the second electric appliance or a second model of the second electric appliance, and
   wherein the controller is configured to:
   (i) control, in response to the first model of the second electric appliance being connected to the appliance connector, the voltage output circuit so as to vary the operating voltage between voltage values included in a first set of voltage values in accordance with the manual operation; and
   (ii) control, in response to the second model of the second electric appliance being connected to the appliance connector, the voltage output circuit so as to vary the operating voltage between voltage values included in a second set of voltage values in accordance with the manual operation, the second set of voltage values including (i) more voltage values than the first set of voltage values or (ii) less voltage values than the first set of voltage values.

4. The voltage control device according to claim 1, wherein the first electric appliance includes a first connection plug configured to be connected to the appliance connector, the first connection plug including a first resistor, and the first resistor having a first resistance value.

5. The voltage control device according to claim 4, wherein the controller is configured to detect that the first electric appliance is connected to the appliance connector based on a voltage across the first resistor.

6. The voltage control device according to claim 4,
   wherein the first electric appliance corresponds to a first model of the first electric appliance or a second model of the first electric appliance, and
   wherein the first resistor in the first model of the first electric appliance has a resistance value distinct from a resistance value of the first resistor in the second model of the first electric appliance.

7. The voltage control device according to claim 1, wherein the second electric appliance includes a second connection plug configured to be connected to the appliance connector, the second connection plug including a second resistor, and the second resistor having a second resistance value.

8. The voltage control device according to claim 7, wherein the controller is configured to detect that the second electric appliance is connected to the appliance connector based on a voltage across the second resistor.

9. The voltage control device according to claim 7,
   wherein the second electric appliance corresponds to a first model of the second electric appliance or a second model of the second electric appliance, and
   wherein the second resistor in the first model of the second electric appliance has a resistance value distinct from a resistance value of the second resistor in the second model of the second electric appliance.

10. The voltage control device according to claim 1, wherein the first electric appliance includes a heat generator.

11. The voltage control device according to claim 10, wherein the first electric appliance is configured in the form of a garment including the heat generator or a lap blanket including the heat generator.

12. The voltage control device according to claim 1, wherein the second electric appliance includes a fan.

13. The voltage control device according to claim 12, wherein the fan is configured to be attached to a helmet.

14. The voltage control device according to claim 12, wherein the second electric appliance is configured in the form of a garment including the fan or a helmet including the fan.

15. The voltage control device according to claim 1, wherein the first electric appliance and/or the second electric appliance are/is configured in the form of a lighting appliance.

16. A system comprising:
a first electric appliance configured to receive a first operating voltage, the first operating voltage being fixed;
a second electric appliance configured to receive a second operating voltage, the second operating voltage being variable; and
a voltage control device including:
   an appliance connector configured to be selectively connected to the first electric appliance or the second electric appliance;
   a voltage output circuit configured to (i) receive a direct voltage from a direct-current power source and (ii) selectively output the first operating voltage or the second operating voltage based on the direct voltage;
   a manual switch configured to be manually operated by a user of the voltage control device; and
   a controller configured to:
      (i) control, in response to the first electric appliance being connected to the appliance connector, the voltage output circuit so as to output the first operating voltage; and
      (ii) control, in response to the second electric appliance being connected to the appliance connector, the voltage output circuit so as to output the second operating voltage varied in accordance with a manual operation applied to the manual switch.

* * * * *